(12) United States Patent
Sabripour et al.

(10) Patent No.: US 11,645,867 B2
(45) Date of Patent: May 9, 2023

(54) DEVICE, METHOD AND SYSTEM FOR CONTROLLING AN ACCESS POINT BASED ON MOVEMENT TRENDS OF A MOVER

(71) Applicant: MOTOROLA SOLUTIONS, INC., Chicago, IL (US)

(72) Inventors: Shervin Sabripour, Chicago, IL (US); Kurt Grossnickle, Chicago, IL (US); Patrick D. Koskan, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 458 days.

(21) Appl. No.: 16/872,807

(22) Filed: May 12, 2020

(65) Prior Publication Data
US 2021/0358252 A1 Nov. 18, 2021

(51) Int. Cl.
*G06T 7/215* (2017.01)
*G06V 20/52* (2022.01)
*G06V 40/10* (2022.01)
*G06V 40/16* (2022.01)

(52) U.S. Cl.
CPC .............. *G06V 40/16* (2022.01); *G06T 7/215* (2017.01); *G06V 20/52* (2022.01); *G06V 40/10* (2022.01); *G06V 40/103* (2022.01); *G06V 40/165* (2022.01); *G06V 40/172* (2022.01)

(58) Field of Classification Search
CPC ........ G06V 40/10; G06V 20/52; G06V 40/20; G06T 7/12; G06T 2207/30221
See application file for complete search history.

(56) References Cited

U.S. PATENT DOCUMENTS

| | | | |
|---|---|---|---|
| 8,547,431 B2 * | 10/2013 | Williams | ............... G06F 16/583 348/169 |
| 10,366,586 B1 | 7/2019 | Leizerovich et al. | |
| 10,496,091 B1 | 12/2019 | Ross et al. | |
| 10,535,146 B1 | 1/2020 | Buibas et al. | |
| 2018/0018508 A1 | 1/2018 | Tusch | |
| 2018/0047193 A1 | 2/2018 | Gao et al. | |

FOREIGN PATENT DOCUMENTS

| | | |
|---|---|---|
| CN | 110232741 A | 9/2019 |
| KR | 20190039179 A | 4/2019 |
| WO | 2017202169 A1 | 11/2017 |

OTHER PUBLICATIONS

Jie-Ci, Yang, et al, An Intelligent Automated Door Control System Based on a Smart Camera. Sensors (Basel, Switzerland). 13. 5923-36. 10.3390/s130505923. (May 2013).

\* cited by examiner

*Primary Examiner* — Daniell L Negron
(74) *Attorney, Agent, or Firm* — Perry + Currier, Inc.

(57) ABSTRACT

A device, method and system for controlling an access point based on movement trends of a mover is provided. A device receives images from a camera device, the camera device configured to image a region adjacent an access point, the access point initially in a first state that prevents access therethrough. The device identifies a designator of a mover in the images. The device determines, using the designator in the images, direction vectors of the mover. The device determines a trend of movement of the mover, relative to the access point, based on changes in one or more of slope and angle of the direction vectors of the mover. The device, in response to determining that the mover is trending towards the access point, changes the access point from the first state to a second state that provides access therethrough.

19 Claims, 13 Drawing Sheets

DEVICE, METHOD AND SYSTEM FOR CONTROLLING AN ACCESS POINT BASED ON MOVEMENT TRENDS OF A MOVER

BACKGROUND OF THE INVENTION

Access points, such as doors, gates, and the like, may be maintained in a closed and/or locked state. While various processes may be used to authorize a user to enter the access point (e.g. based on facial recognition, and the like), a user may not actually intend to enter the access point.

BRIEF DESCRIPTION OF THE SEVERAL VIEWS OF THE DRAWINGS

The accompanying figures, where like reference numerals refer to identical or functionally similar components throughout the separate views, together with the detailed description below, are incorporated in and form part of the specification, and serve to further illustrate embodiments of concepts that include the claimed invention, and explain various principles and advantages of those embodiments.

Figure 1:
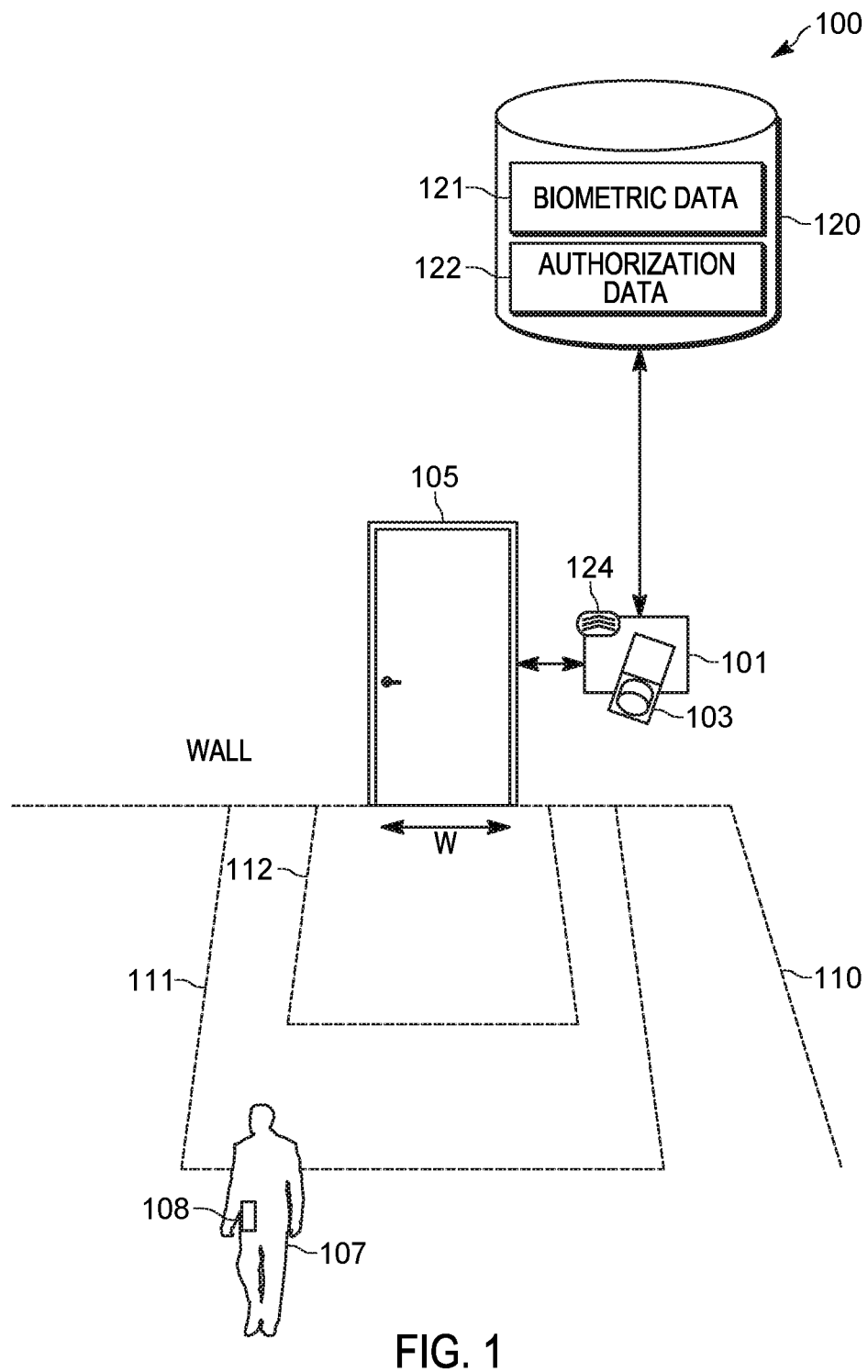
FIG. 1 is a system for controlling an access point based on movement trends of a mover, with an access point being in a first state that prevents access therethrough, in accordance with some examples.

Skilled artisans will appreciate that components in the figures are illustrated for simplicity and clarity and have not necessarily been drawn to scale. For example, the dimensions of some of the components in the figures may be exaggerated relative to other components to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Access points, such as doors, gates, and the like, may be maintained in a closed and/or locked state. While various processes may be used to authorize a user to enter the access point (e.g. based on facial recognition, and the like), a user may not actually intend to enter the access point. Regardless, the access point may be opened and/or unlocked automatically, allowing an unauthorized user to pass therethrough.

Hence, according to the present specification, a device is provided that determines "intent" of a mover (e.g. a human, a user, and the like) moving relative to an access point (e.g. such as a door, a pair of doors, a gate, and the like) using a designator of the mover in images from a camera device that images a region adjacent the access point. The designator generally includes any suitable consistent measurement of an object in images of a field-of-view of the camera device, including, but not limited to, a bounding box around a mover's face, body and/or any other suitable body part, and the like; in particular examples, the designator may comprise a facial bounding box. The device generally tracks movement of the mover relative to the access point by determining changes in the designator in the images, which may move in the images, and/or increase, or decrease, in size in the images, depending on the movement of the mover. In particular, changes in the designator may be translated into movement of the mover relative to the access point; for example, as described herein, positions and angles of the mover relative to the access point may be determined using the designator in the images which may be used to determine direction vectors. A trend of movement of the mover, relative to the access point, based on changes in one or more of slope and angle of the direction vectors of the mover may be determined. Hence, in general, a trend of movement of the mover, relative to the access point, may be determined based on changes in the direction vector as determined from changes in the position and the angle of the mover, as determined from changes in the designator. For example an average of the slopes of the direction vector (e.g. as determined from a last given number of positions of the mover), may be applied to a last position of the mover, to determine whether the mover is trending towards the access point. Alternatively, a differential and/or a direction field differential of the direction vectors (e.g. as using a last given number of positions of the mover) may be used to determine the trend of the movement (e.g. such differentials inherently determine changes in the slope and/or angle of the direction vectors). When the device determines that the mover is trending towards the access point, which may generally indicate "intent" of the mover to enter the access point, the device may open and/or unlock the access point. Such opening and/or unlocking may be performed in conjunction with authorizing the mover to enter the access point using facial recognition of the mover (e.g. using the images from the camera device) and/or exchanging a token with a mobile device carried by the mover, and the like.

An aspect of the specification provides a method comprising: receiving, at a computing device, images from a camera device, the camera device configured to image a region adjacent an access point, the access point initially in a first state that prevents access therethrough; identifying, at the computing device, a designator of a mover in the images; determining, at the computing device, using the designator in the images, direction vectors of the mover; determining, at the computing device, a trend of movement of the mover, relative to the access point, based on changes in one or more of slope and angle of the direction vectors of the mover; and in response to determining that the mover is trending towards the access point, changing, at the computing device, the access point from the first state to a second state that provides access therethrough.

Another aspect of the specification provides a device comprising: a controller in communication with a camera device and an access point, the camera device configured to image a region adjacent the access point, the access point initially in a first state that prevents access therethrough, the controller configured to: receive images from the camera device; identify a designator of a mover in the images; determine, using the designator in the images, direction vectors of the mover; determine a trend of movement of the mover, relative to the access point, based on changes in one or more of slope and angle of the direction vectors of the mover; and in response to determining that the mover is trending towards the access point, change the access point from the first state to a second state that provides access therethrough.

Attention is directed to FIG. 1, which depicts an example system 100 for controlling an access point based on movement trends of a mover. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

The system 100 comprises a computing device 101 (e.g. hereafter referred to interchangeably as the device 101) which is in communication with a camera device 103; in some examples (as depicted), the device 101 may comprise the camera device 103 however, in other examples, the device 101 may be separate from the camera device 103. The camera device 103 may comprise a digital camera, a video camera, and the like, that acquires electronic images periodically, for example according to a given frame rate, and the like.

The system 100 further comprises an access point 105, such as a door, a double door, a gate, a portal, an entrance, a turnstile, an exit, and the like through which passage is electronically controlled. The access point 105 may be located at an entrance and/or an exit to a building and/or room and/or hallway, and the like, through which passage is electronically controlled. While the access point 105 is depicted as a physical barrier mechanism, the access point 105 may additionally and/or alternatively comprise any suitable non-physical barrier mechanism through which passage is controlled, for example, using electromagnetic fields, disorienting holograms, or another non-visible type of barrier mechanism that may be used prevent passage therethrough. In the depicted examples, the access point 105 comprises a single physical door, that may be electronically locked, unlocked, opened and/or closed; in particular, when the door is unlocked and/or opened, a mover may pass therethrough.

While a particular geometry of the access point 105 is depicted, the access point 105 may have any suitable geometry. For example, as depicted, a geometry of the access point 105 includes the access point 105 being a single physical door of a given width W, parallel to a wall (e.g. labelled "Wall") into which the access point 105 is set, with a large open area in front of the door. However, the access point 105 may have a different width, and/or include two physical doors, and/or be located in a hallway, and/or at a corner of a hallway (e.g. which may include the access point 105 being angled at 45°, and the like), an end of a hallway, be one of two doors (and/or two sets of double doors) in "funnel" (e.g. such that a mover has to pass through a first door and/or set of doors and a second door and/or set of doors located one after the other in a narrow hallway), and/or be at any suitable angle and/or depth relative to a wall, and the like.

Initially, the access point 105 is in a state that prevents access therethrough; for example, while not depicted, the access point 105 generally comprises a passage control mechanism such as an electronic lock, an open/close mechanism (e.g. door opening/closing mechanism and/or gate opening/closing mechanism, and the like). Hence, initially, the access point 105 may be closed and/or locked. As depicted, a mover 107 is moving relative to the access point 105 and may, or may not, intend to enter the access point 105. As depicted, the mover 107 is optionally carrying a mobile device 108, described in more detail below. As will be described herein, the device 101 is generally configured to determine an "intent" of the mover 107 and change the access point 105 from a first state, where access therethrough is prevented, to a second state that provides access therethrough, when the device 101 determines that the mover 107 intends to enter the access point 105, for example as represented by a trend of movement of the mover 107.

As depicted, the device 101 and the camera device 103 may be combined in a single device and mounted adjacent the access point 105. While as depicted the device 101 and the camera device 103 are mounted beside the access point 105, the term "adjacent" may be understood to mean any position relative to the access point 105 which may enable the camera device 103 to image the mover 107 approaching the access point 105 and may include, but is not limited to, the camera device 103 being mounted on a wall and/or surface beside the access point 105, on a ceiling, and the like, above the access point 105, on a wall and/or surface across from the access point 105, and/or any other suitable wall and/or surface and/or ceiling. The camera device 103 generally images a region 110 adjacent the access point 105.

For example, the region 110 may include a field-of-view of the camera device 103 and/or a subset of the field-of-view of the camera device 103, and the like. In particular, as depicted, the camera device 103 (e.g. with the device 101) may be mounted to a side of the access point 105 and angled in a direction towards the access point 105. As will be described in more detail below, the region 110 may be electronically divided by the device 101 into one or more sub-regions; for example, as depicted, the region 110 has been divided into a first sub-region 111 and a second sub-region 112. The first sub-region 111 is smaller than the region 110, and the first sub-region includes the second sub-region 112. However, one or more of the sub-regions 111, 112 may be optional.

The device 101 generally receives images from the camera device 103, which, when the mover 107 is located in the region 110, include at least a portion of the mover 107, such as a face of the mover 107, a body part of the mover 107, and the like. The device 101 may determine a designator of the mover 107 in the images, such as a bounding box that includes the face and/or a body part of the mover 107. While hereafter the designator will be described with respect to a facial bounding box, it is understood that the designator may comprise any suitable consistent measurement of the mover 107 in images from the camera device 103 (e.g. such as a head of the mover 107, a head outline of the mover 107, a profile (e.g. a side and/or three-quarter outline, and the like) of the of the mover 107, a profile outline of the mover 107 a head plus shoulders of the mover 107, a head plus shoulders outline of the mover 107, a full body of the mover 107, a full body outline of the mover 107, and/or any other suitable body part and/or outline thereof, of the mover 107).

The device 101 is hence generally configured to determine the designator for the images (e.g. for each of the images), as received from the camera device 103. The device 101 generally tracks movement of the mover 107 relative to the access point 105 by determining changes in the designator in the images (e.g. in time-adjacent images), which may move in the images and/or increase, or decrease, in size in the images, depending on the movement of the mover 107.

In particular, changes in the designator may be translated into movement of the mover 107 relative to the access point 105; for example, as described herein, positions and angles of the mover 107 relative to the access point 105 may be determined using the designator in the images, which may be used to determine direction vectors of the mover 107 relative to the access point 105. For example, a direction vector for the mover 107 at a given position may be determined by comparing the given position to a previous position (e.g. an adjacent previous position and/or a last previous position) of the mover 107; a vector "drawn" from the previous position to the given position generally defines the direction vector. Hence, for example, a respective direction vector may be determined for positions of the mover 107 (e.g. other than a first and/or initial position) based on changes to a designator between the positions.

A trend of movement of the mover 107, relative to the access point 105, is generally determined based on changes in one or more of slope and angle of the direction vectors of the mover 107.

For example, an average of the slope of the directions vectors (and/or a subset of the direction vectors and/or a last given number of the direction vectors) may be determined, and applied to a last and/or mean position of the mover, to determine whether the mover is trending towards the access point 105. For example, the average slope may be determined and used to generate a direction vector extending from a last position of the mover 107 to determine whether such a direction vector intersects the access point 105, as described in more detail below.

Similarly, a differential and a direction field differential of the direction vectors (and/or a subset of the direction vectors and/or a last given number of the direction vectors) may be determined to determine whether the mover is trending towards the access point 105. For example, the differential and the direction field differential of the direction vectors may indicate that a direction of the movement of the mover 107 intersects the access point 105, as described in more detail below.

Hence, in general, a trend of movement of the mover 107, relative to the access point 105, may be determined based on changes in the direction vectors determined from changes in the designator (e.g. from image to image as received from the camera device 103). When the device 101 determines that the mover 107 is trending towards the access point 105, which may generally indicate "intent" of the mover 107 to enter the access point 105, the device 101 may open and/or unlock the access point 105.

Such opening and/or unlocking may be performed in conjunction with performing an authorization process for the mover 107 which may include, but is not limited to, identifying an authorized body part (e.g. such as the face) of the mover 107 (e.g. using the images from the camera device 103 and/or a body part identified in the designator) and/or exchanging an authorized token with the mobile device 108 carried by the mover 107 and/or any other suitable authorization process.

For example, as depicted, the device 101 is in further communication with a memory 120 (e.g. a database, and the like), that stores authorized biometric data 121 of the mover 107, and authorization data 122 used to verify an authorized token of the mobile device 108.

For example, the biometric data 121 may be used to authenticate the mover 107 based on images and/or biometric data, and the like, acquired via the camera device 103 and/or any other suitable device for acquiring biometric data of the mover 107. For example, the biometric data 121 may store biometric signatures and/or biometric enrollment data (e.g. one or more values that represent biometric data that has been previously acquired), and the like, of the mover 107 extracted from previously acquired images of the mover 107. While present examples are described with reference to facial recognition being used for authentication, any suitable biometric signatures and/or biometric data may be used to authenticate the mover 107 including, but not limited to, facial landmarks, a gait of the mover 107, an outline of the mover 107, and the like. Hence, for example, the camera device 103 may capture an image of the mover 107 that includes a body part (e.g. a face of a designator) that may be compared to the biometric data 121 to authenticate the mover 107. The device 101 may hence determine that a body part (e.g. a face) identified in the designator comprises an authorized body part (e.g. a face represented by facial landmarks stored in the biometric data 121) and cause the device 101 to change the access point 105 from the first state to the second state, in conjunction with determining that the mover 107 is trending towards the access point 105.

As depicted, the system 100 may further comprise a reader device 124 and the like, which, for example, may be integrated with the device 101 and/or located adjacent the access point 105. The reader device 124 may "read" and/or receive and/or exchange an authorized token with the mobile device 108 using any suitable wireless communication link including, but not limited to, Bluetooth™, near field communication (NFC), and the like. The mobile device 108 may hence include a mobile phone, an NFC card, and access card, and the like, configured to communicate with the reader device 124 via the wireless communication link. The device 101 may use the reader device 124 to read an authorized token from the mobile device 108 and authenticate the authorized token using the authorization data 122, which may be used to authenticate the mover 107 and cause the device 101 to change the access point 105 from the first state to the second state in conjunction with determining that the mover 107 is trending towards the access point 105.

Furthermore, while particular processes of authenticating the mover 107 are described, the device 101 may implement other authentication processes to authenticate the mover 107 including, but not limited to, a password entry process, a fingerprint reader process, a voice authentication process, an iris reader process, and the like, with the system 100 and/or the device 101 adapted accordingly to include corresponding hardware. Furthermore, while two particular processes of authenticating the mover 107 are described, system 100 and/or the device 101 may be adapted to implement fewer than two authentication processes (e.g. as few as no authentication processes, or one authentication process) or more than two authentication processes.

Figure 2:
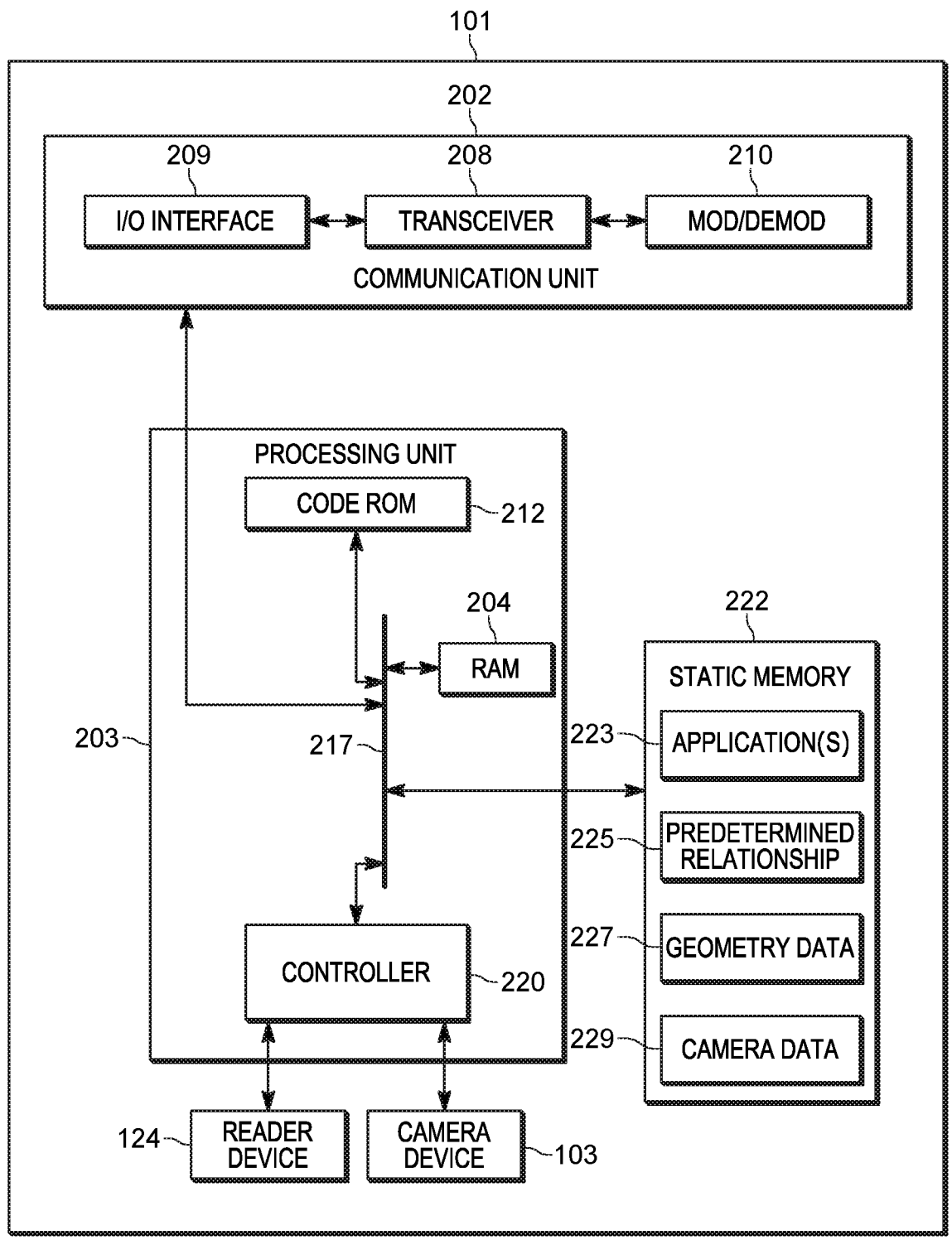
FIG. 2 is a device diagram showing a device structure of a device for controlling an access point based on movement trends of a mover, in accordance with some examples.

Attention is next directed to FIG. 2 which depicts a schematic block diagram of an example of the device 101. In general, the device 101 may comprise a discrete device mountable to a surface adjacent an access point (e.g. the access point 105) and connectable (e.g. in a wired and/or wireless manner) to a passage control mechanism of the access point. As has already been described, in some examples, as depicted in FIG. 2, the device 101 may be combined with the camera device 103 and/or any other suitable device of the system 100, such as the reader device 124. The device 101 may further be in communication with the memory 120 which may be local or remote from the device 101, and in communication therewith via any suitable combination of wired and/or wireless communication links.

As depicted, the device 101 comprises: a communication unit 202, a processing unit 203, a Random-Access Memory (RAM) 204, one or more wireless transceivers 208 (which may be optional), one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the device 101 may include one or more of an input device and a display screen and the like such that a user, such as an installer, and the like, may interact with the device 101.

As shown in FIG. 2, the device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with other components of the system 100. For example, the communication unit 202 may include one or more transceivers 208 and/or wireless transceivers for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g. a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 210.

The controller 220 may include ports (e.g. hardware ports) for coupling to other suitable hardware components of the system 100.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the computing device 101 is not a generic controller and/or a generic device, but a device specifically configured to implement functionality for controlling an access point based on movement trends of a mover. For example, in some examples, the computing device 101 and/or the controller 220 specifically comprises a computer executable engine configured to implement functionality for controlling an access point based on movement trends of a mover.

The static memory 222 comprises a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the computing device 101 as described herein are maintained, persistently, at the memory 222 and used by the controller 220, which makes appropriate utilization of volatile storage during the execution of such programming instructions.

Figure 3:
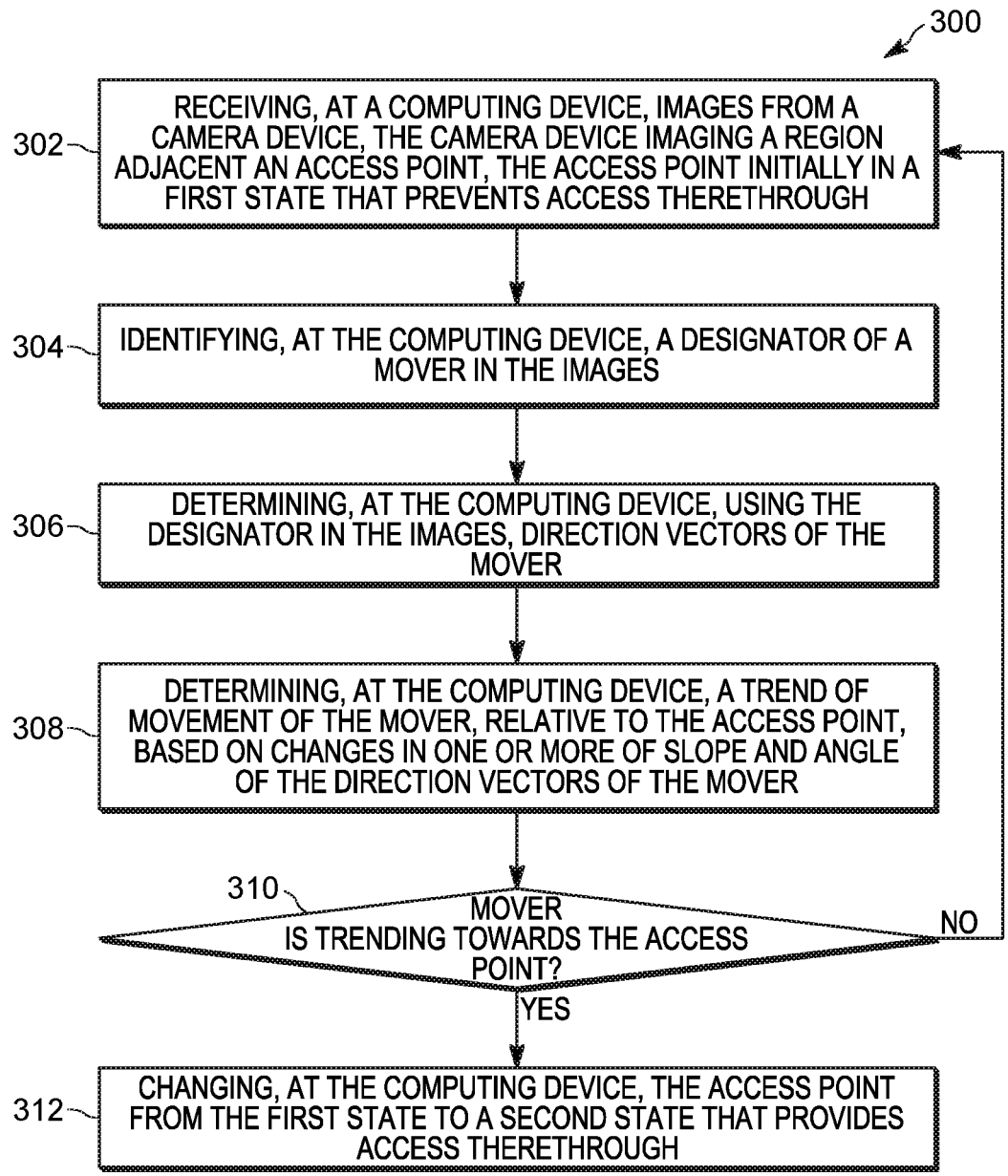
FIG. 3 is a flowchart of a method for controlling an access point based on movement trends of a mover, in accordance with some examples.

In particular, the memory 222 stores instructions corresponding to the at least one application 223 that, when executed by the controller 220, enables the controller 220 to implement functionality for controlling an access point based on movement trends of a mover, but not limited to, the blocks of the method set forth in FIG. 3.

In illustrated examples (e.g. with respect to FIG. 4, FIG. 5, FIG. 6 and FIG. 7, FIG. 8 and FIG. 9), when the controller 220 executes the one or more applications 223, the controller 220 is enabled to: receive images from a camera device, the camera device configured to image a region adjacent an access point, the access point initially in a first state that prevents access therethrough; identify a designator of a mover in the images; determine, using the designator in the images, direction vectors of the mover; determine a trend of movement of the mover, relative to the access point, based on changes in one or more of slope and angle of the direction vectors of the mover; and in response to determining that the mover is trending towards the access point, change the access point from the first state to a second state that provides access therethrough.

As will be explained in more detail below, the memory 222 may further store and/or alternatively store, instructions corresponding to the at least one application 223 and/or a module thereof and/or another application, that, when executed by the controller 220, enables the controller 220 to implement functionality for controlling an access point based on movement trends of a mover relative to a predetermined path, but not limited to, the blocks of the method set forth in FIG. 11. In illustrated examples (e.g. with respect to FIG. 10, FIG. 11, FIG. 12 and FIG. 13), when the controller 220 executes the one or more applications 223, the controller 220 is enabled to: receive images from a camera device, the camera device configured to image a region adjacent an access point, the access point initially in a first state that prevents access therethrough; identify a designator of a mover in the images; determine, using the designator in the images, that movement of the mover originates from a preconfigured region-of-interest in the images; determine, using the designator in the images, direction vectors of the mover; determine a trend of the movement of the mover, relative to a predetermined path that originates from the preconfigured region-of-interest and enters the access point, based on changes in one or more of slope and angle of the direction vectors of the mover; and in response to determining that the mover is following the predetermined path, change the access point from the first state to a second state that provides access therethrough.

The application 223 may include programmatic algorithms, and the like, to implement functionality for controlling an access point based on movement trends of a mover. While in some examples, the application 223 may include machine learning algorithms, the application 223, described in more detail below, is generally simple enough to be implemented without the use of machine learning algorithms; indeed, as the device 101 may comprise a commercial device to be purchased, mounted to a surface adjacent an access point 105, and connected to a passage control mechanism of the access point 105 (and optionally the memory 120), processing resources of the device 101 may be limited as compared to other computing devices such as servers and the like. Furthermore, the device 101 may be configured to function "out of the box" hence, use of machine learning algorithms may be undesirable as such algorithms often need training to function.

Hence, as will be described hereafter, the device 101 may be configured with predetermined information used by the device 101 to control an access point without the use of machine learning algorithms.

For example, as depicted, the memory 222 further stores a predetermined relationship 225 between a size of a body part of a mover in a designator, and distance from the camera device 103. For example, the predetermined relationship 225 may comprise a function which defines a relationship between a distance from the camera device 103 and a body part (e.g. a face) in images from the camera device 103. Such a relationship may generally be predetermined, for example by measuring face size of subjects at known real world distances and using polynomial regression, and the like, to determine a function therebetween, which may be stored at the predetermined relationship 225. In a particular example, the function of the predetermined relationship 225 may map face size (e.g. in pixel height, and/or pixel width, and/or pixel height*pixel width, and/or or pixel hypotenuse distance of a facial bounding box) to real world distance from the camera device 103. As the position of the camera device 103, relative to the access point 105 may also be preconfigured (e.g. as described below with respect to geometry data 227), the function of the predetermined relationship 225 also defines a relationship between a distance from the access point 105 and a body part (e.g. a face) in images from the camera device 103.

As depicted, the memory 222 further stores a set of geometry data 227 defining geometry of an access point where the device 101 and/or the camera device 103 is to be mounted, such as the access point 105. For example, the geometry data 227 may comprise a width of an access point (e.g. the given width "W" of the access point 105), locations of walls, relative to an access point, and the like. The geometry data 227 may assume that the camera device 103 is mounted adjacent to an access point at a given distance (e.g. to the left or right from an access point), and the like, which assists with determining the relationship between the distance from the access point 105 and the body part (e.g. a face) in images from the camera device 103, as described above. As such, the device 101 may be provided to an installer with instructions on where to mount the camera device 103 (and/or the device 101) relative to the access point 105, in accordance with the geometry data 227.

Furthermore, the geometry data 227 may be used to determine a mode for determining the trend of the mover 107. For example, as described herein, an average of the changes in the slope of the direction vectors and/or a differential and/or a direction field differential of the direction vectors may be used to determine a trend of a mover. In particular, for an access point that has a geometry where a mover may easily approach the access point (e.g. where there is an open space in front of the access point), the averaging mode may be used. However, for an access point that has a geometry where a mover may not easily approach the access point (e.g. where the access point is located in a tight corner such that a mover has to approach the access point from acute angles), the differential mode may be used. The geometry data 227 may hence indicate whether the controller 220 is to determine a trend of the mover 107 using the averaging mode and/or the differential mode. Indeed, in some examples, the averaging mode may be first used to determine the trend of the mover 107 and the differential mode may be used as the mover 107 gets closer to an access point, and the geometry data 227 may indicate such a mixed mode; indeed, in some examples, the averaging mode may be used to determine the trend of the mover 107 in the first sub-region 111, and the differential mode may be used to determine the trend of the mover 107 in the second sub-region 112. However, the averaging mode and the differential mode may be combined in any suitable manner, which may also be indicated by the geometry data 227.

Furthermore, the geometry data 227 may comprise one of a plurality of sets of geometry data that define different access point geometries (e.g. different widths, numbers of doors, locations of access points relative to walls and/or hallways, and the like); an installer may select a set of geometry data that corresponds to the geometry of an access point where the camera device 103 (and/or the device 101) is being installed and install the camera device 103 (and/or the device 101) accordingly. In a particular example, an access point may be provided with a code, such as a bar code, and the like, and which may be read by the camera device 103 (e.g. prior to installation), that indicates the set of geometry data that is to be selected as the geometry data 227; the sets of geometry data may also include installation instructions which may be provided to an installer once a set of geometry data is selected (and/or the installer may download the installation instructions from a website address included with a set of geometry data and/or indicated by the code at the access point). Hereafter it is understood that the geometry data 227 generally defines the geometry of the access point 105 and further defines respective sizes and/or shapes of the sub-regions 111, 112. It is further understood, however, that one or more of the sub-regions 111, 112 may be optional, and hence not all sets of geometry data may be provided with indications of such sub-regions. Furthermore, a shape of the sub-regions 111, 112 may be indicated by the geometry data 227; for example, while the sub-regions 111, 112 are depicted as rectangular, the sub-regions 111, 112 may be any suitable shape (e.g. square, triangular, circular, oval, irregular shapes, etc.) Hereafter, however, it will nonetheless be assumed that the sub-regions 111, 112 are present.

In particular, the geometry data 227 may further define a map (e.g. an electronic map), and the like, that includes the access point 105 and the region 110 (e.g. as well as the sub-regions 111, 112). Hence, the geometry data 227 may define the field-of-view of the camera device 103 relative to the access point 105. A zone of the map may generally correspond to a location and geometry of the access point 105, where a width of such a zone corresponds to the given width W of the access point 105.

In some examples, as described in more detail below, the geometry data 227 may further define given regions extending from one or more ends of the access point 105, for example, which may be in a same direction as the width of the access point 105 and/or at an angle thereto. For example, such given regions extending from one or more ends of the access point 105 may be to the left and right of the access point 105 (e.g. parallel to the access point 105 and/or at an angle to the access point 105). Such given regions may be used to extend the given width of the access point 105 used to determine whether movement of the mover 107 is trending towards the access point 105.

Furthermore, the map of the geometry data 227 may define the given regions extending from one or more ends of the access point 105 in the form a respective zone that includes the zone that corresponds to the access point 105. Put another way, the geometry data 227 may define a first zone that includes the access point 105, and a second zone that includes the access point 105 and given regions extending from one or more ends of the access point 105. For example, the second zone may be longer than the first zone and include the first zone. However, the second zone may be optional.

As will further be describe below with respect to FIG. 10, FIG. 11, FIG. 12 and FIG. 13, the geometry data 227 may store preconfigured regions-of-interest that may be associated with predetermined paths.

As depicted, the memory 222 further stores camera data 229 of the camera device 103. For example, the camera data 229 may include a predetermined angular field-of-view of the camera device 103; and a predetermined pixel width of the camera device 103, and the like. The predetermined angular field-of-view, for example in radians and/or degrees, and the predetermined pixel width of the camera device 103 may be used to determine an angle of a mover (e.g. the mover 107) relative to the access point 105. Returning to the example of a face bounding block, a distance from an edge of the image, in pixels, to a center of a face bounding block (e.g. of the mover 107), in an image of the camera device 103 may be determined, and compared to the predetermined pixel width of the camera device 103, for example as a ratio. The ratio may be multiplied by the predetermined angular field-of-view (e.g. in radians or degrees) of the camera device 103 to determine the angle (e.g. in radians or degrees) of the mover 107 relative to the camera device 103. As the position of the camera device 103 relative to the access point 105 may also be preconfigured (e.g. as described with respect to the geometry data 227), the angle of the mover 107 relative to the camera device 103 also defines the angle of the mover 107 relative to the access point 105. Hence, the distance and the angle may be used to determine a geospatial location (e.g. in XY coordinates and/or two-dimensional planar geospatial coordinates), and the like, of the mover 107 at the map of the geometry data 227, as described in more detail below.

Attention is now directed to FIG. 3 which depicts a flowchart representative of a method 300 for controlling an access point based on movement trends of a mover. The operations of the method 300 of FIG. 3 correspond to machine readable instructions that are executed by the device 101, and specifically the controller 220 of the device 101. In the illustrated example, the instructions represented by the blocks of FIG. 3 are stored at the memory 222 for example, as the application 223. The method 300 of FIG. 3 is one way in which the controller 220 and/or the computing device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the device 101 receives images from the camera device 103. As has already been described, the camera device 103 is positioned and/or configured to image the region 110 adjacent the access point 105, the access point 105 initially being in a first state that prevents access therethrough such as a locked state, a closed state, and the like.

At a block 304, the controller 220 and/or the device 101 identifies a designator of the mover 107 in the images. As has already been described, such a designator may include, but is not limited to, a facial bounding box and/or any other suitable type of designator. For example, the designator may be determined for each image received from the camera device 103 and/or a subset of the images received from the camera device 103. It is further understood that two images that are received in a time adjacent manner (e.g. an image that is received and a next image that is received) indicate time-adjacent positions of the mover 107.

At a block 306, the controller 220 and/or the device 101 determines, using the designator in the images, direction vectors of the mover 107.

For example, two images that are received in a time adjacent manner (e.g. an image that is received and a next image that is received) indicate time-adjacent positions of the mover 107. Hence, at the block 306, the controller 220 and/or the device 101 may determine positions and angles of the mover 107 relative to the access point 105, using the designator in the images, based on: the predetermined relationship 225 between a size of a body part (e.g. a face) of the mover 107 in the designator, and distance from the access point 105; a predetermined angular field-of-view of the camera device 103 (e.g. as defined in the camera data 229); and a predetermined pixel width of the camera device 103 (e.g. as defined in the camera data 229). The positions and angles (e.g. determined using the designator for two time-adjacent images) may be used to determine XY coordinates (and/or two-dimensional planar geospatial coordinates) of the mover 107 for two time-adjacent positions (e.g. that correspond to the two time-adjacent images). The XY coordinates (and the like) for the two time-adjacent positions to determine a direction vector therebetween; the direction vector may be associated with the second of the two time-adjacent positions. Hence, direction vectors for the mover 107 may be determined for the positions of the mover 107 (e.g. other than for a first position).

At a block 308, the controller 220 and/or the device 101 determines a trend of movement of the mover 107, relative to the access point 105, based on changes in one or more of slop and angle of the direction vectors of the mover 107.

For example, the controller 220 and/or the device 101 may determine a trend of movement of the mover 107 by determining that an average (and/or running average) slope of the direction vectors indicates that the mover 107 is trending towards the access point 105. For example an average (and/or running average) of the slopes of the direction vector (e.g. as determined from a last given number of positions of the mover 107), may be applied to a last position of the mover 107, to determine whether the mover 107 is trending towards the access point. In particular, an average (and/or running average) slope, of a last given number (e.g. such as four or five, or another given number) of the direction vectors, may be determined to determine a trend in the changes to the slope. The average (and/or running average) slope may be determined using a sum-of-squares process (e.g. in which a sum of squares of "x" direction differences is compared to a sum of the "x" direction differences multiplied by "y" direction differences, for a given number of the direction vectors, to determine an average (and/or running average) slope). A given "xy position" for the mover 107, used to determine a trend of movement, may be selected as being a last position of the mover 107; and/or a given "xy position" for the mover 107, used to determine a trend of movement, may be selected as being a mean of the "x" positions and a respective mean of the "x" positions, for the last given number (e.g. such as four or five, or another given number) of the direction vectors. Indeed, hereafter references to an average of changes to a direction vector and/or slope may include, but is not limited to, a running average. Hence, for example, a last and/or mean position of the mover 107 may be determined. An average direction vector that represents an average of the last given number of the direction vectors may be determined using the given "xy position" and the average slope, and the controller 220 and/or the device 101 may determine the trend of movement of the mover 107 using such an average direction vector; put another way, such an average direction vector is based on changes in the slope and/or angle of the direction vectors of the mover 107.

Alternatively, an average of the direction vectors may be determined by averaging slopes and/or angles, and positions, thereof in any suitable manner Alternatively, a differential and/or a direction field differential of the direction vectors (e.g. as using a last given number of positions of the mover 107, as described above) may be used to determine the trend of the movement of the mover 107 (e.g. such differentials inherently determine changes in the slope and/or angle of the direction vectors). For example, a direction field may be determined for the direction vectors using any suitable function that represents direction of the direction vectors; such a function may include, but is not limited to $f(x,y)=x+y(1-y)$, for example, which additively compare an "x" position of the mover 107 at a particular position with a y position of the mover 107 multiplied by 1 minus they position (e.g. such a function, as it changes represents a trend of the "x" and "y" positions of the mover 107). A differential of the function may be determined for direction vectors (e.g. and/or which may be determined over a grid) to determine the trend of movement of the mover 107. Put another way, differential and/or a direction field differential of the direction vectors may be "plotted" (e.g. electronically) to determine whether the mover 107 is trending towards the access point 105.

Hence changes in one or more of slope and angle of a plurality of the direction vectors may be used to determine a trend of movement of the mover 107. For example, the differences in positions in the angles of the mover 107 in time-adjacent images may generally indicate the direction vector (e.g. a distance and direction) of movement of the mover 107 (e.g. and/or a slope and/or angle of movement of the mover 107), relative to the access point 105. While the mover 107 may initially move towards the access point 105, the mover 107 may suddenly turn away from the access point 105 (e.g. due to a change of mind and/or intent of the mover 107 to enter the access point 105, erratic behavior of the mover 107, and the like); as such, the device 101 generally determines a trend and/or an average (and/or running average) trend in the movement of the mover 107 using the using the changes in one or more of slope and angle of a plurality of the direction vectors, to determine whether the mover 107 is trending towards the access point 105 to take into account such variations in movement of the mover 107. Put another way, movement of the mover 107 may be determined from an "average" (and/or running average) slope and/or angle of a plurality direction vectors of the mover 107, and the like, whether determined using an averaging process or a differential process (which yields a trend of movement that is effectively an average (and/or running average) trend of movement).

While present examples are described with respect to direction vectors, in yet further examples, velocity vectors (e.g. a vector having a magnitude and direction) of the mover 107 may be determined (e.g. using time adjacent positions and angles of the mover 107, and a time therebetween, which may be determined from a frame rate of the camera device 103), and movement of the mover 107 may be determined from changes slope and/or angle of such velocity vectors of the mover 107. However, such velocity vectors are effectively the same as the above described direction vectors divided by a time period (e.g. a time between acquiring time-adjacent images); hence, determining velocity vectors and/or changes in one or more of slope and angle of velocity vectors, generally respectively includes determining direction vectors and/or changes in one or more of slope and angle of direction vectors, as described herein.

In some examples, the controller 220 and/or the device 101 may begin the determining of the trend of the movement of the mover 107 when the mover 107 is located within a sub-region of the region 110, such as the first sub-region 111, adjacent the access point 105, as determined using the designator in the images. Put another way, to save on processing resources, the controller 220 and/or the device 101 may not begin the determining of the trend of the movement of the mover 107 until the controller 220 and/or the device 101 determines that the mover 107 is located in the first sub-region 111 (and/or any other suitable sub-region). Put yet another way, the controller 220 and/or the device 101 may begin the determining of the trend of the movement of the mover 107 in response to determining that the mover 107 is located within a sub-region of the region 110 adjacent the access point 105, as determined using the designator in the images.

At a block 310, the controller 220 and/or the device 101 determines whether, or not, the mover 107 is trending towards the access point 105. Such a determination may comprise determining that the average direction vector, determined using the averaging process described above, intersects the access point 105 and/or that a plot of the differential and/or a direction field differential of the direction vectors as described above, intersects the access point 105.

Furthermore, as described above, the geometry data 227 may define a map that includes a first zone corresponding to the access point 105 and/or a second zone that includes given regions extending from one or more ends of the access point 105. In these examples, the controller 220 and/or the device 101 may determine that the mover 107 is trending towards the access point 105 based on the average direction vector intersecting the first zone or the second zone, and/or a plot of the differential and/or a direction field differential of the direction vectors as described above, intersecting the first zone or the second zone.

In these examples, the average direction vector and/or a plot of the differential and/or a direction field differential of the direction vectors may be electronically plotted on the map to determine whether the trend of movement of the mover 107 is towards the first zone and/or the second zone. However, such a map is understood not to be graphically plotted (e.g. as on a display screen) but may be electronically determined using the controller 220.

Put another way, the controller 220 and/or the device 101 may determine that the mover 107 is trending towards the access point 105 by one or more of: determining that the mover 107 is trending towards a first zone that includes the access point 105; and determining that the mover 107 is trending towards a second zone that includes the access point 105 and given regions extending from one or more ends of the access point 105.

Put another way, the controller 220 and/or the device 101 may determine that the mover 107 is trending towards the access point 105 by determining that the changes in one or more of the slope and the angle of the direction vectors of the mover 107 indicates that the movement of the mover 107, and/or the trend of the movement of the mover 107, intersects with one or more the first zone and the second zone.

Put yet another way, the controller 220 and/or the device 101 may determine that the mover 107 is trending towards the access point 105 by determining that the changes in one or more of the slope and the angle of the direction vectors of the mover indicates that the movement of the mover 107, and/or the trend of the movement of the mover 107, intersects with one or more of the access point 105 and given regions extending from one or more ends of the access point 105.

In response to determining that the mover 107 is trending towards the access point 105 (e.g. a "YES" decision at the block 310), at a block 312, the controller 220 and/or the device 101 changes, at the computing device, the access point 105 from the first state to a second state that provides access therethrough. As has already been described, the first state may comprise one or more of a locked state and a closed state of the access point 105; and the second state may comprise one or more of an unlocked state and an open state of the access point 105. For example, at the block 312, the controller 220 and/or the device 101 may communicate with a passage control mechanism of the access point 105 to unlock and/or open the access point 105. For example, the controller 220 and/or the device 101 may communicate with an electronic lock and/or door opening mechanism and/or gate opening mechanism, and the like, to unlock and/or open the access point 105.

Furthermore, the controller 220 and/or the device 101 may implement the block 312 in conjunction with an authorization process. For example, changing the access point 105 from the first state to the second state, via the controller 220 and/or the device 101, may occur in response to: determining that the mover 107 is trending towards the access point; and one or more of: determining that a body part identified in the designator comprises an authorized body part (e.g. by comparing the body part of the designator with the biometric data 121); and exchanging an authorized token with the mobile device 108 (e.g. by comparing the authorized token received from the mobile device 108 via the reader device 124 with the authorization data 122).

In some examples, the controller 220 and/or the device 101 may change the access point 105 from the first state to the second state further based on a location of the mover 107. As has already been mentioned, the controller 220 and/or the device 101 may begin determining of the trend of the movement of the mover 107 when the mover 107 is located in the first sub-region 111. In some of these examples, the controller 220 and/or the device 101 may change the access point 105 from the first state to the second state further based on the mover 107 trending towards the access point 105 within the first sub-region 111 and the mover 107 also being located in the second sub-region 112. As such, a size of the second sub-region 112 may be selected based on the mover 107 being close enough to the access point 105 such that the access point 105 may be opened so that only the mover 107 may enter the access point 105. For example, if the second sub-region 112 were too large, the access point 105 may be unlocked, allowing an unauthorized mover, and the like, to enter the access point 105 before the mover 107 reaches the access point 105. In further examples, size of the second sub-region 112 may be selected heuristically based on historical locations of movers relative to access points when they intend to enter an access point and/or when they are in a position to open an unlocked access point using a handle, and the like (e.g. such historical locations may be based on an average arm length of movers). In yet further examples, where the access point 105 comprises a door that may be automatically and physically swung open, a size of the second sub-region 112 may be based on one or more of a size of the door and/or a time period for the door to physically open such that, when the mover 107 approaches the door through the second sub-region 112, the door has enough time to open so the mover 107 does not have to wait to pass therethrough. In some of these examples, the size of the second sub-region 112 may be dynamic and based on a speed and/or velocity of the mover 107 (e.g. the size of the second sub-region 112 may increase as the speed and/or velocity of the mover 107 increases, and/or the size of the second sub-region 112 may decrease as the speed and/or velocity of the mover 107 decreases).

Put another way, the controller 220 and/or the device 101 may be configured to change the access point 105 from the first state to the second state in response to: determining that the mover 107 is trending towards the access point 105 within the first sub-region 111 of the region 110 adjacent the access point 105; and determining that the mover 107 is located in the second sub-region 112 of the region 110 adjacent the access point 105, the second sub-region 112 being one or more of: smaller than the first sub-region 111 and within the first sub-region 111.

Regardless, at the block 312 the controller 220 and/or the device 101 may automatically unlock and/or open the access point 105 such that the mover 107 may pass therethrough, for example in conjunction with automatically authorizing the mover 107 to pass therethrough. The mover 107 may hence approach the access point 105, and seamlessly pass therethrough without waiting for the access point 105 to unlock and/or open.

Returning briefly to the block 310, in response to determining that the mover 107 is not trending towards the access point 105 (e.g. a "NO" decision at the block 310), the controller 220 and/or the device 101 may (as depicted) repeat the method 300 from the block 302 and/or any other suitable block of the method 300. Determining that the mover 107 is not trending towards the access point 105 may include, but is not limited to, determining that the changes in one or more of the slope and the angle of the direction vectors of the mover indicates that the movement of the mover 107 is not trending towards the access point 105 (and/or the first zone and/or the second zone referred to above).

However, other factors may be used to determine whether the mover 107 is trending towards the access point 105. For example, in some examples, the controller 220 and/or the device 101 may determine the mover 107 is trending towards the access point 105 when changes in one or more of the slope and the angle of the direction vectors of the mover indicates that the movement of the mover 107, intersects the access point 105 (and/or the first zone and/or the second zone referred to above) for at least a time period that is greater than a threshold time period. For example, when changes in one or more of the slope and the angle of the direction vectors of the mover indicates that the movement of the mover 107 intersects the access point 105, and the like, for less than the threshold time period, the controller 220 and/or the device 101 may determine the mover 107 is not trending towards the access point 105; similarly, when changes in one or more of the slope and the angle of the direction vectors of the mover indicates that the movement of the mover 107 intersects the access point 105, and the like, for greater than (e.g. and/or equal to) the threshold time period, the controller 220 and/or the device 101 may determine the mover 107 is trending towards the access point 105. The threshold time period may be determined heuristically based on average and/or historical movement trends of movers who have intended to enter access points.

In other examples, the controller 220 and/or the device 101 may determine using the designator of the images, that the mover 107 is located in the region 110 (and/or the first sub-region 111 and/or the second sub-region 112) adjacent the access point 105, but has stopped moving towards the access point 105, based on the designator of the images being about stationary in the images. For example, the designator may appear to "hover" in adjacent images, moving slightly from side to side and/or slightly increasing and/or decreasing. Such behavior of designators may be referred to as "clustering" and may indicate that the mover 107 has stopped in the region 110 (and/or the first sub-region 111 and/or the second sub-region 112). In such examples, the controller 220 and/or the device 101, in response to determining that the mover 107 is located in the region 110 (and/or the first sub-region 111 and/or the second sub-region 112) adjacent the access point, but has stopped moving (and/or in response to determining that the designator is clustering in the images), may maintain the access point 105 in the first state (e.g. a closed and/or locked state).

Figure 4:
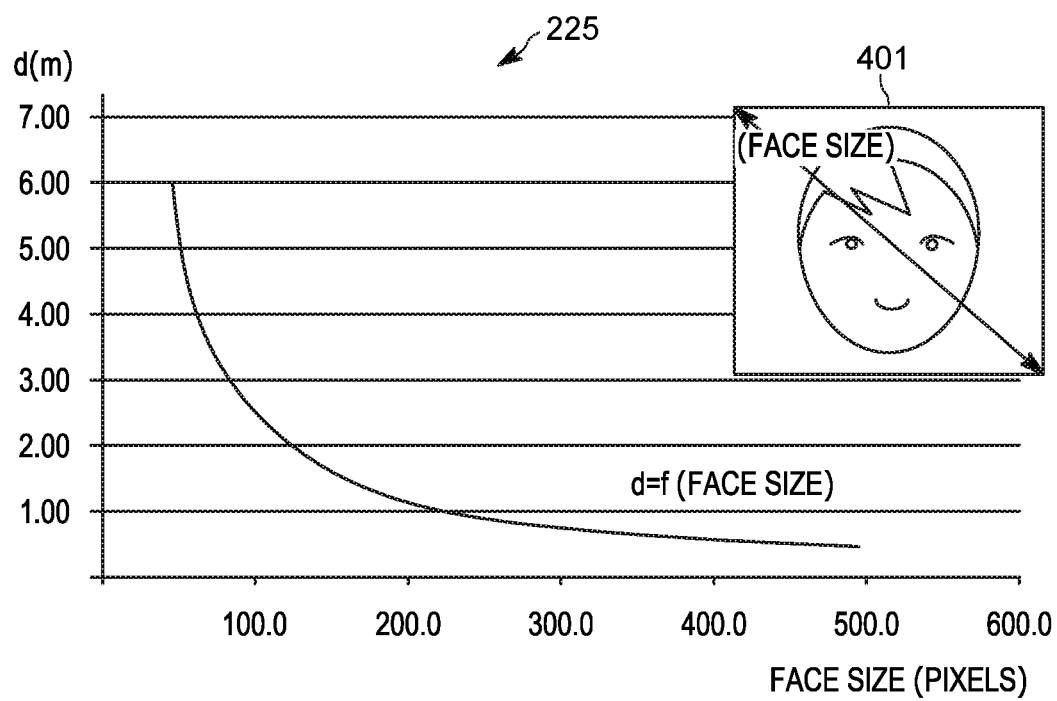
FIG. 4 depicts a particular example of a predetermined relationship between a designator (e.g. a facial bounding block), and a distance (e.g. a two-dimensional planar geospatial distance) from the access point, shown in a graphical format, and example of a designator, in accordance with some examples.

Attention is next directed towards FIG. 4 which depicts a particular example of the predetermined relationship data 225 shown in a graphical format, as well as an example of a designator 401. As depicted, the designator 401 comprises a facial bounding box of an image that includes a face of the mover 107, where the facial bounding box surrounds the face of the mover 107 in the image. While the entire image that includes the face of the mover 107 is not shown, it is nonetheless understood to be present. Furthermore, while the face of the mover 107 in the facial bounding box is a full frontal view of a face, the face of the mover 107 in the facial bounding box may include a side view, a three-quarter view, and/or any other suitable view of the face of the mover 107.

In the particular example, the predetermined relationship data 225 indicates a relationship between a distance, d, (e.g. in meters) from the camera device 103 (e.g. a two-dimensional planar geospatial distance), and a face size of the face in the facial bounding box (e.g. a hypotenuse of the facial bounding box in pixels and/or the corner to opposite corner distance of the facial bounding box indicated by the arrow labelled "Face Size" in the designator 401). As depicted, the curve of the graphical format of the predetermined relationship data 225, as shown, may be expressed as a function d=f(Face Size), where "f" is a function that converts face size to distance. The function may be a reverse exponential function, and the like, as shown by the curve of the graphical format of the predetermined relationship data 225, with a smaller hypotenuse of the facial bounding box yielding larger distances, and vice versa.

Figure 5:
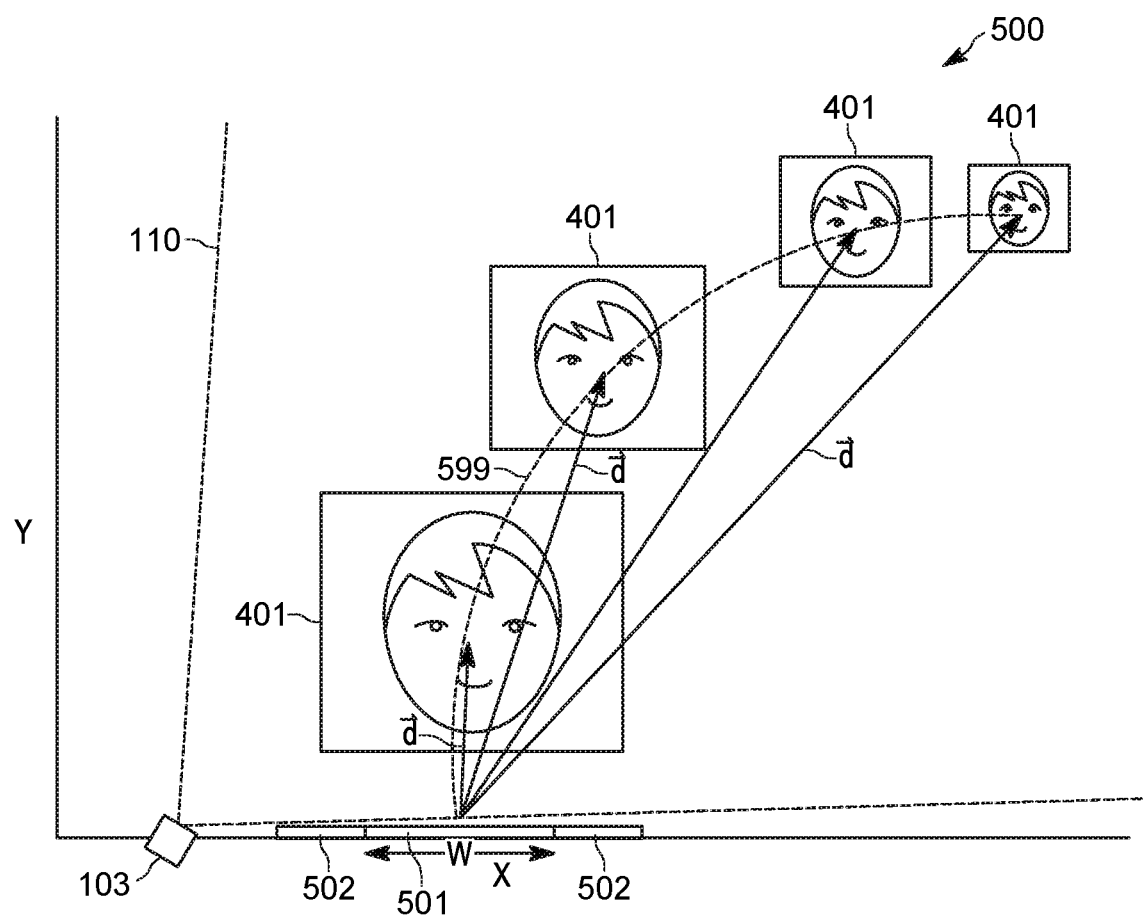
FIG. 5 depicts an example of a graphical view of a region imaged by a camera device and designators indicative of a position of a mover, in accordance with some examples.

Attention is next directed to FIG. 5 which depicts an example of a graphical view 500 of the region 110 (e.g. a map thereof), with an "X" axis being in a direction that includes the camera device 103 and the access point 105, and the "Y" axis being about perpendicular to the "X" axis. As depicted, the graphical view 500 shows a location of the camera device 103, with the region 110 as extending from the camera device 103 according to the field-of-view of the camera device 103. As depicted, the graphical view 500 further shows a first zone 501 corresponding to a location, and the given width W, of the access point 105 (e.g. relative to the camera device 103 and/or the region 110). Similarly, the graphical view 500 further shows a second zone 502, extending from ends of the first zone 501 and corresponding to given regions extending from ends (e.g. left and right ends) of the access point 105, as described above.

Further depicted at the graphical view 500 are designators 401, as described above with respect to FIG. 5. In particular, the designators 401 are depicted at respective locations (e.g. geospatial locations relative to the access point 105) where the mover 107 has been determined to be located at respective times at which images were acquired by the camera device 103, using positions and angles determined as described above. For example designators 401 that are adjacent along a line 599 are understood to be time adjacent.

It is apparent from the relative locations (e.g. as indicated by respective vectors $\vec{d}$ from a center of the first zone 501), and relative sizes of the depicted designators 401 that, as the designator 401 increases in size, the mover 107 moves closer to the camera device 103 and hence closer to the access point 105 (and/or the zones 501, 502). A vector $\vec{d}$ represent the position and angle of the mover 107 relative to the access point 105 for a given image acquired at a given time.

Also depicted in the graphical view 500 is the line 599 which indicates the movement in location and time of the designators 401 (e.g., and hence movement in time of the mover 107). Hence the line 599 furthers shows a trend of movement of the mover 107. The line 599 may be determined, by device 101, from changes in one or more of slope and angle of direction vectors of the mover 107, as described in more detail below.

As depicted, the line 599 shows that a trend of movement of the mover 107 intersects the first zone 501, and hence may generally indicate that the mover 107 intends to enter the access point 105. The device 101 may hence change the access point 105 from the first state, that prevents access therethrough, to the second state that provides access therethrough.

Figure 6:
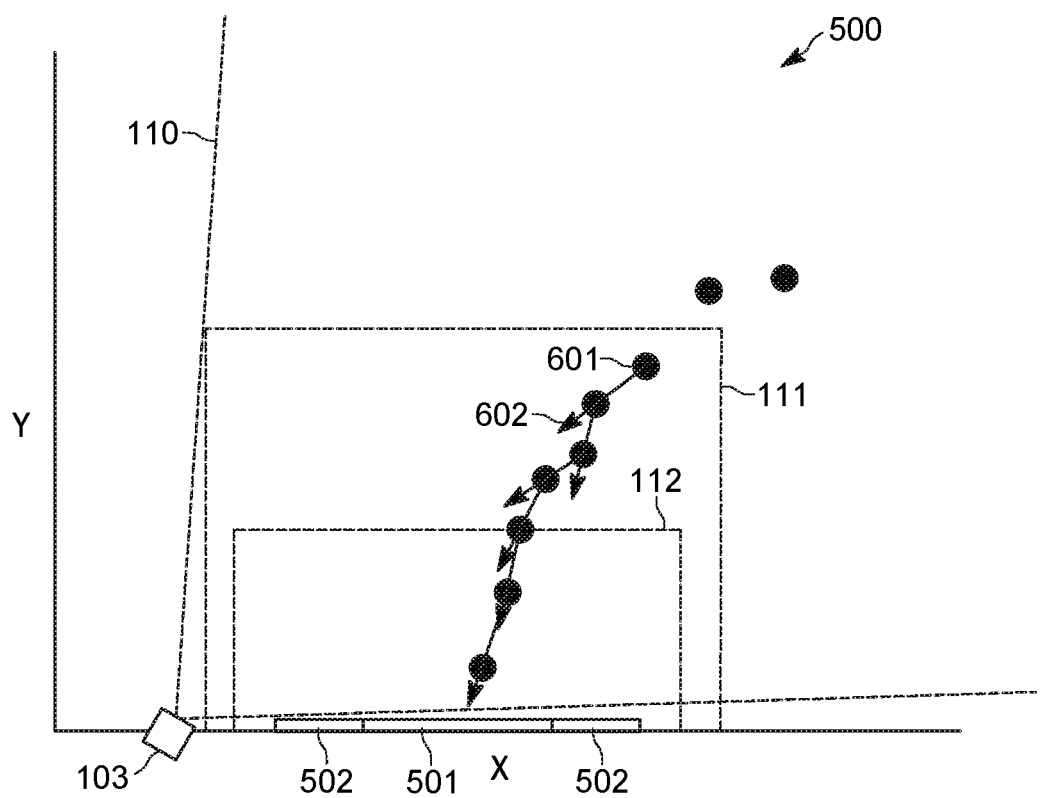
FIG. 6 depicts the graphical view of the region of FIG. 5 showing positions of the mover, and respective direction vectors between time-adjacent positions, used to determine a trend of movement of the mover, in accordance with some examples.
Figure 7:
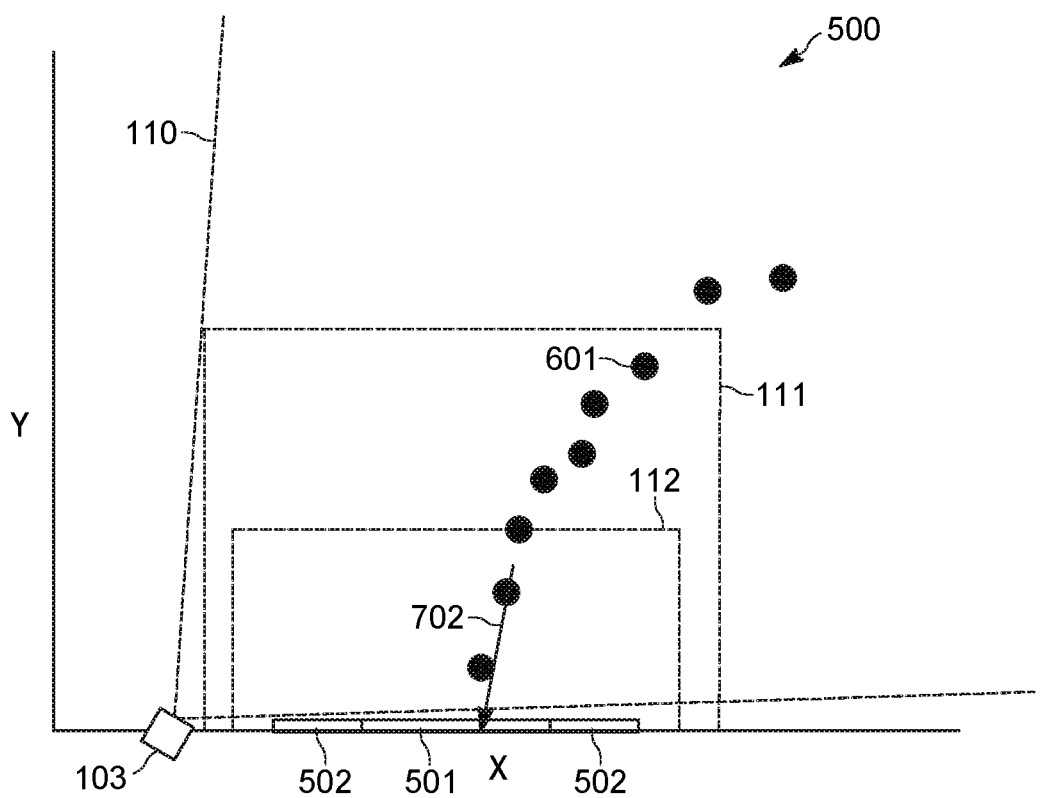
FIG. 7 depicts the graphical view of the region of FIG. 6 showing positions of the mover, and an average direction vector, used to determine a trend of movement of the mover, in accordance with some examples.
Figure 8:
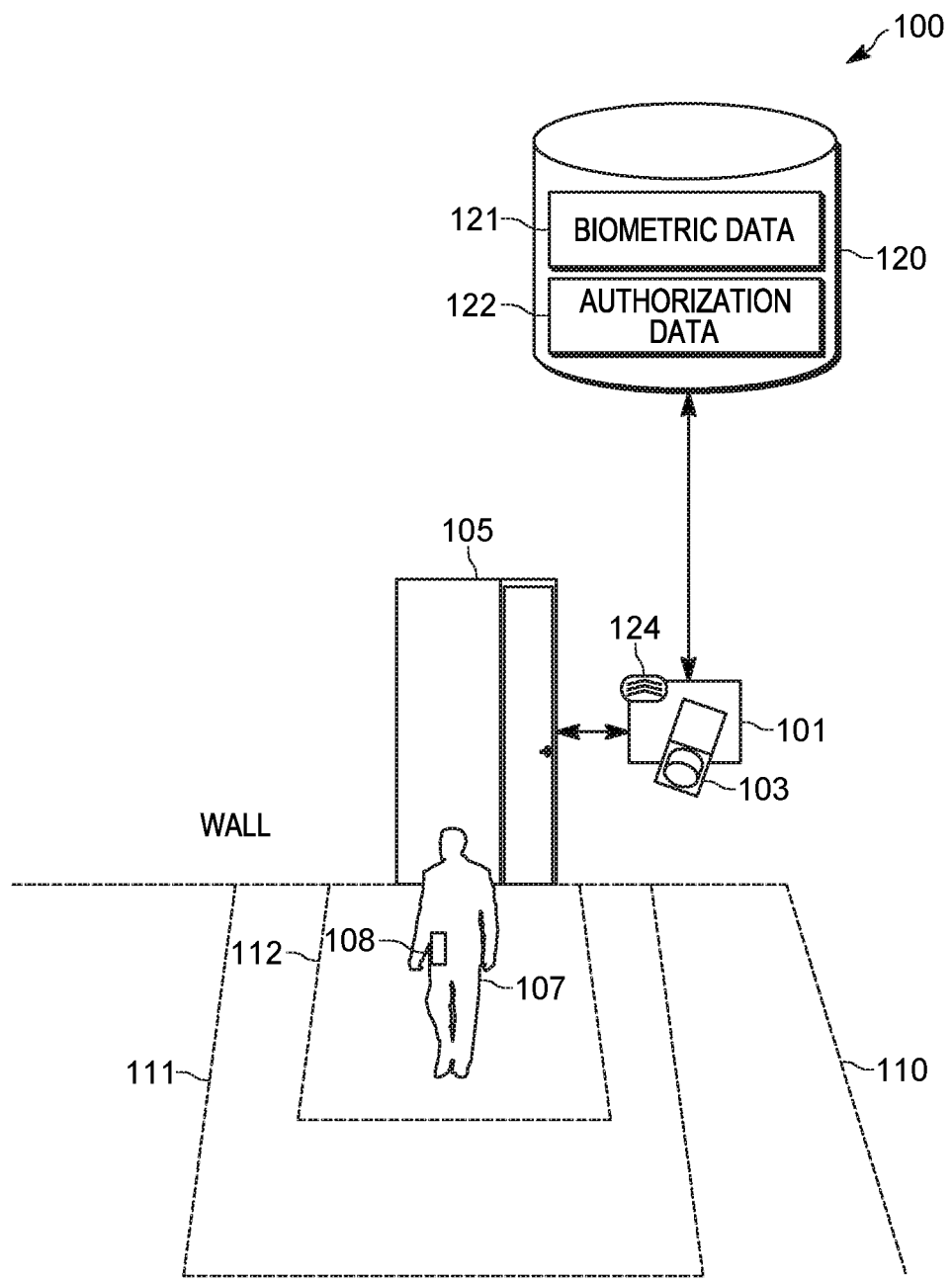
FIG. 8 depicts the system of FIG. 1, with an access point controlled from a first state, that prevents access therethrough, to a second state that provides access therethrough, in accordance with some examples.

Attention is next directed to FIG. 6 which depicts the graphical view 500 showing the first sub-region 111 and the second sub-region 112. Also depicted, are locations 601 of the mover 107 as determined using the designators 401, relative to the access point 105 (and/or the first zone 501 and/or the second zone 502). Put another way, in FIG. 6 the locations 601 of the designators 401 are shown (e.g., rather than the designators 401 themselves). While more locations 601 are shown in FIG. 6 than a number of designators 401 in FIG. 5, it is understood that FIG. 6 may show more detail of movement of the mover 107 as compared to FIG. 5.

Furthermore, while for simplicity only one location 601 is indicated/labelled in FIG. 6, it is understood that each circle in FIG. 6 corresponds to a respective location 601. Furthermore, locations 601 that are adjacent in time are joined in FIG. 6, by a respective direction vector 602 (e.g. depicted as arrows passing through time-adjacent locations 601) having a slope determined by a change of position and angle of locations 601 that are adjacent in time. The direction vector 602 generally has a same slope as a corresponding velocity vector; indeed, in some examples, the direction vectors 602 may be replaced by respective velocity vectors. FIG. 6 further shows that the vectors 602 may not be determined until a location 601 of the mover 107 is within the first sub-region 111. For example, for the two circles/locations 601 outside the first sub-region 111, the vectors 602 are not determined.

From the slopes of the direction vectors 602, an average and/or a running average, of changes in slope of the movement of the mover 107 may be determined. Similarly, from the direction vectors 602, an average (and/or a running average) direction vector and/or average (and/or running average) velocity vector may be determined (e.g. having a slope indicative of the average (and/or running average) of changes in slope).

For example, attention is next directed to FIG. 7 which again depicts the graphical view 500 as shown in FIG. 6, but with the direction vectors 602 replaced by an average direction vector 702, determined by averaging, for example, a subset of the direction vectors 602, as described above, such as the last four direction vectors 602 (e.g. the last four direction vectors in time). Generally, a slope of the average direction vector 702 may have a slope indicative of the average slope of a subset of the direction vectors 602. A location of a starting position of the average direction vector 702 may be determined from a mean, and the like, of the "x" and "y" coordinates of the starting positions of the subset of the direction vectors 602. Alternatively, a location of a starting position of the average direction vector 702 may be a starting position of last direction vector 602 (e.g. as determined from two last determined positions determined from the designator of two last received images).

In particular, as depicted, the average direction vector 702 is intersecting the first zone 501 (and/or the second zone 502), which may generally indicate that the mover 107 intends to enter the access point 105. Hence, the device 101 may responsively change the access point 105 from the first state, that prevents access therethrough, to the second state that provides access therethrough.

Alternatively, the plot of the differential and/or a direction field differential of the direction vectors 602 may be determined and electronically plotted; which may intersect the first zone 501 (and/or the second zone 502), which may generally indicate that the mover 107 intends to enter the access point 105. Hence, the device 101 may responsively change the access point 105 from the first state, that prevents access therethrough, to the second state that provides access therethrough For example, attention is next directed to FIG. 8, which is substantially similar to FIG. 1, with like components having like numbers. However, in FIG. 8, the device 101 has determined that the mover 107, who is now moved to the second sub-region 112, towards the access point 105, and hence intends to enter the access point 105, as described above. As such, the device 101 has changed the access point 105 from the first state depicted in FIG. 1, to the second state that provides access therethrough; in particular, in FIG. 8, the door of the access point 105 has been opened.

Figure 9:
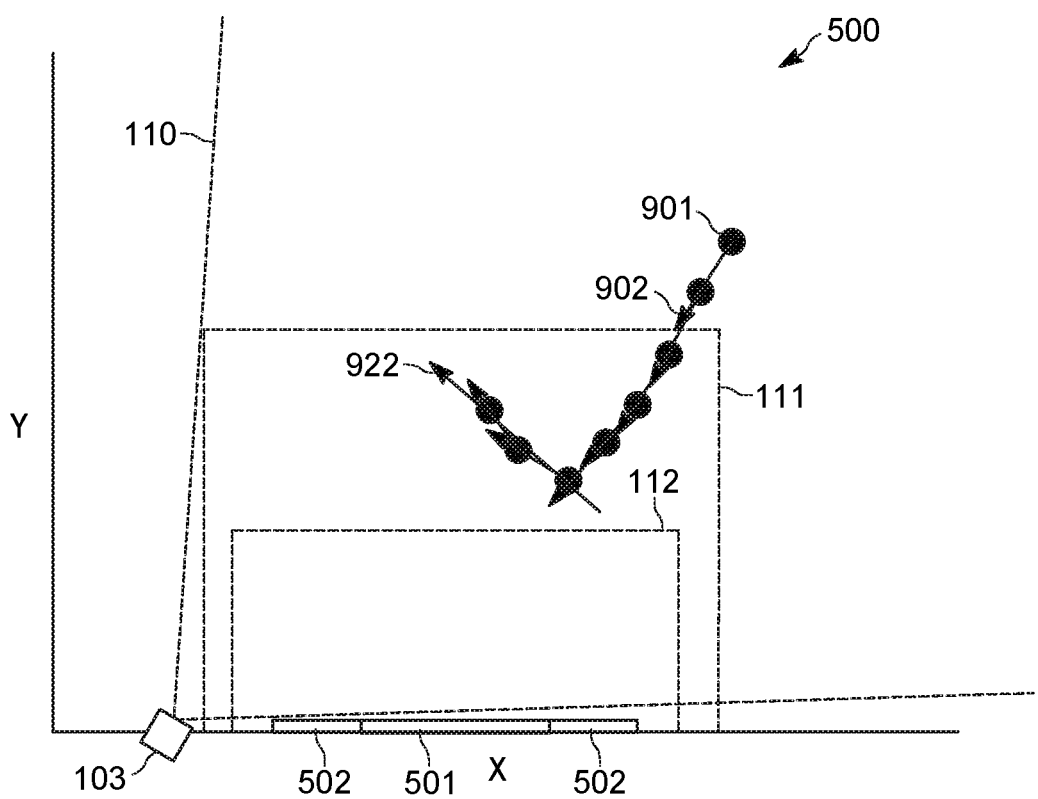
FIG. 9 depicts a graphical view showing positions of a mover that does not intend to enter an access point, respective direction vectors thereof, and an average direction vector used to determine a trend of movement of the mover, in accordance with some examples.

Attention is next directed to FIG. 9 which depicts the graphical view 500 showing the first sub-region 111 and the second sub-region 112, as well as locations 901 for another mover who does not intend to enter the access point 105. As with the locations 601, the locations 901 are determined using designators, as described above. Furthermore, while for simplicity only one location 901 is indicated/labelled in FIG. 6, it is understood that each circle in FIG. 9 corresponds to a respective location 901. Furthermore, locations 901 that are adjacent in time are joined in FIG. 9, by a respective direction vector 902 (e.g. depicted as arrows passing through time-adjacent locations 901) having a slope determined by a change of position and angle of locations 901 that are adjacent in time.

However, in contrast to the movement of the mover 107, as depicted in FIG. 6, in FIG. 9, the movement of a mover enters the first sub-region 111, moving towards the access point 105, and then turns around and moves away from the access point 105. Hence, an average direction vector 922, determined as described above, for example from a last four of the direction vectors 902, does not intersect the access point 105 (e.g. the average direction vector 922 does not intersect the zone 501 and/or the zone 502), and hence the device 101 determines that the mover, whose movement is shown in FIG. 9, does not intend to enter the access point 105 and maintains the access point 105 in a first state that prevents access therethrough (e.g. the access point 105 is not opened and/or unlocked).

Heretofore, determining a trend of movement in the regions 111, 112 has been used to reduce use of processing resources at the device 101 (e.g. by beginning determining of the trend of the movement of the mover 107 in response to determining that the mover 107 is located within the sub-region 111, as opposed to determining the trend when the mover 107 is anywhere in region 110). However, in other examples preconfigured regions-of-interest (ROIs) and associated predetermined paths may be used to reduce use of processing resources at the device 101.

Figure 10:
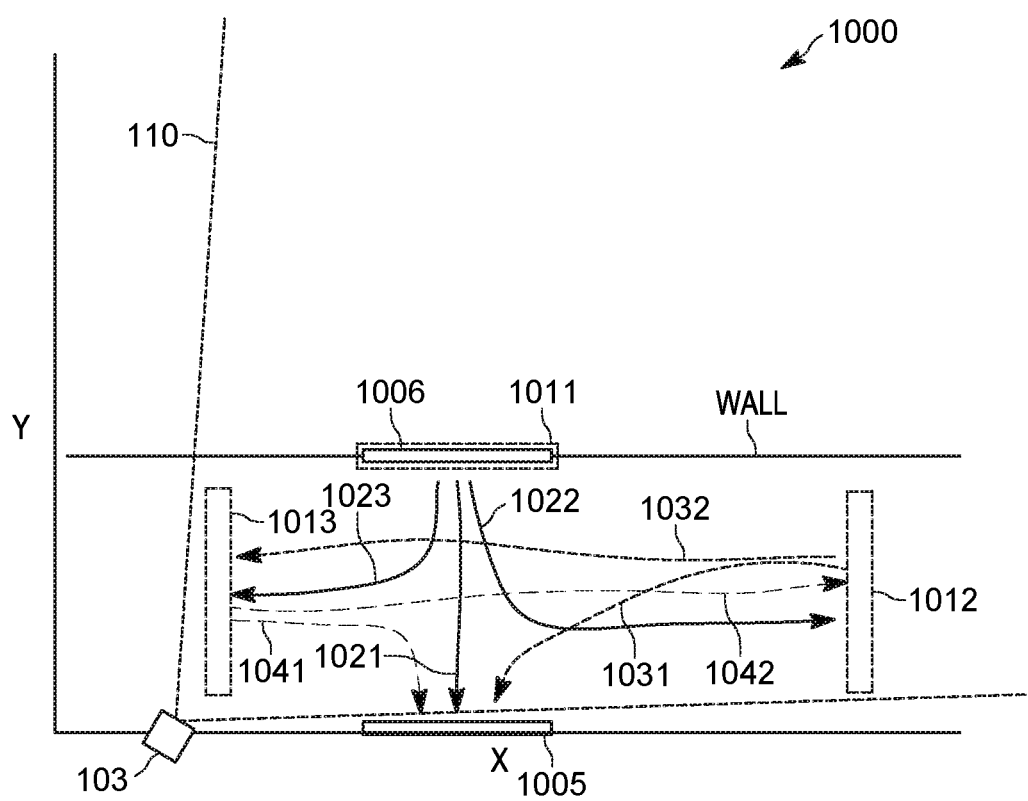
FIG. 10 depicts a graphical view of another access point in a hallway with a camera device mounted adjacent thereto, as well as locations of regions of interest and associated predetermined paths, in accordance with some examples.

For example, attention is next directed to FIG. 10 which depicts an example of a graphical view 1000 of another access point 1005 (e.g. similar to the access point 105) with the camera device 103 mounted adjacent the access point 1005, and the region 110 representing the field-of-view of the camera device 103, as described above. In particular, in FIG. 10, the camera device 103 (e.g. and the device 101) has been mounted adjacent the access point 1005 which is located in a hallway with another access point 1006 in a wall (e.g. labelled "Wall" in FIG. 10) across the hallway from the access point 1005. FIG. 10 is hence similar to FIG. 6, and may include a map of the region 110, with an "X" axis being in a direction that includes the camera device 103 and the access point 1005, and the "Y" axis being about perpendicular to the "X" axis and in direction that includes the access point 1006.

In contrast to FIG. 6, the graphical view 1000 further shows various ROIs 1011, 1012, 1013 that may be preconfigured and/or predetermined at the device 101, for example stored at the memory 222 in a module of the application 223 and/or in the geometry data 227, and the like. In particular, the ROIs 1011, 1012, 1013 indicate regions of ingress and egress of the field-of-view of the camera device 103 which, as depicted, include: a first ROI 1011 that is located at the access point 1006 across the hall from the access point 1005; a second ROI 1012 located about perpendicular to the hallway on one side of the access point 1005; and a third ROI 1013, opposite the second ROI 1012, located about perpendicular to the hallway on another side of the access point 1005. In general, the ROIs 1011, 1012, 1013 represent regions of the field-of-view of the camera device 103 where movers tend to most commonly enter and exit the field-of-view and which are preconfigured based on the geometry of the access point 1005 and/or by a technician installing the camera device 103 (and/or the device 101). While three ROIs 1011, 1012, 1013 are depicted, fewer than three ROIs, or more than three ROIs, may be preconfigured and/or predetermined at the device 101.

Also depicted in FIG. 10 are predetermined paths associated with each ROI 1011, 1012, 1013. For example, as depicted, the ROI 1011 is associated with predetermined paths 1021, 1022, 1023. As depicted, the predetermined path 1021 originates from the preconfigured ROI 1011 and enters the access point 1005, the predetermined path 1022 originates from the preconfigured region-of-interest 1011 and turns (e.g. relative to exiting the access point 1005) left towards the ROI 1012 and does not enter the access point 1005 and/or passes the access point 1005, and the predetermined path 1023 originates from the preconfigured region-of-interest 1011 and turns (e.g. relative to exiting the access point 1005) right (e.g. towards the ROI 1013) and does not enter the access point 1005 and/or passes the access point 1005. Hence, the predetermined paths 1021, 1022, 1023 are understood to be associated with the ROI 1011.

Predetermined paths 1031, 1032 associated with the ROI 1012, and predetermined paths 1041, 1042 associated with the ROI 1013 are also depicted. The predetermined paths 1031, 1041 originate from a respective preconfigured ROI 1012, 1013 and enter the access point 1005, and the predetermined paths 1032, 1042 originate from a respective preconfigured ROI 1012, 1013 and pass (e.g. do not enter) the access point 1005.

In particular, the predetermined paths 1021, 1022, 1023, 1031, 1032, 1041, 1042 may generally represent statistical models of paths of movers that originate at the ROIs 1011, 1012, 1013 and which may be determined by the device 101 based on monitoring movement of movers exiting the access point 1006 (e.g. who then enter the access point 1005, or move left or right down the hallway), using the camera device 103. Such statistical models representing the paths 1021, 1022, 1023, 1031, 1032, 1041, 1042 may be stored at the memory 222.

For example, with reference to the ROI 1011, when a technician initially installs the camera device 103 and the device 101, the device 101 may be operated in a training mode to monitor movement of movers exiting the access point 1006 using the camera device 103; indeed, the technician may operate the device 101 in the training mode and repeatedly exit the access point 1006 to turn left, right and move across the hall to enter the access point 1005, to assist the device 101 with initiating and/or generating statistical models representing the paths 1021, 1022, 1023. However, the device 101 may continue to monitor movers exiting the access point 1006 to continue to update and/or refine the statistical models representing the paths 1021, 1022, 1023. In particular, the device 101 may determine locations of movers as described above with respect to FIG. 4, FIG. 5 and FIG. 6 to determine and/or classify a path of time-adjacent consecutive locations as representing a path exiting the access point 1006 and turning left, right or entering the access point 1005. Such paths may be averaged to determine the statistical models of the paths 1021, 1022, 1023 and stored at the memory 222 in association with the ROI 1011. The paths 1031, 1032, 1041, 1042 may be determined in a similar manner. Furthermore, any suitable statistical process for determining statistical models of the paths 1021, 1022, 1023, 1031, 1032, 1041, 1042 is within the scope of the present specification. However, any suitable statistical process for determining the paths 1021, 1022, 1023, 1031, 1032, 1041, 1042, and/or a suitable model of the paths 1021, 1022, 1023, 1031, 1032, 1041, 1042, is within the scope of the present specification.

In some particular examples, the predetermined paths 1021, 1022, 1023, 1031, 1032, 1041, 1042 may be determined using numerical algorithms, while in other examples, the predetermined paths 1021, 1022, 1023, 1031, 1032, 1041, 1042 may be determined using any suitable machine learning algorithms. When machine learning algorithms are used to determine the predetermined paths 1021, 1022, 1023, 1031, 1032, 1041, 1042, in a machine learning training mode, the device 101 may generate respective machine learning classifiers, and the like, for the predetermined paths 1021, 1022, 1023, 1031, 1032, 1041, 1042. Hence, the predetermined paths 1021, 1022, 1023, 1031, 1032, 1041, 1042 may be stored at the memory 222, in association with respective ROIs 1011, 1012, 1013 in any suitable format.

As described hereafter, the predetermined paths 1021, 1022, 1023, 1031, 1032, 1041, 1042 may be used by the device 101 to determine an intent of a mover and in particular whether a mover, whose location originates at one of the ROIs 1011, 1012, 1013, intends to enter the access point 1005. Such intent may be determined by determining, at the device 101, a trend of the movement of mover, relative to a predetermined path 1021, 1031, 1041 that originates from a preconfigured region-of-interest 1011, 1012, 1013, and enters the access point 1005, based on changes in one or more of slope and angle of direction vectors of the mover, similar to as described above.

Figure 11:
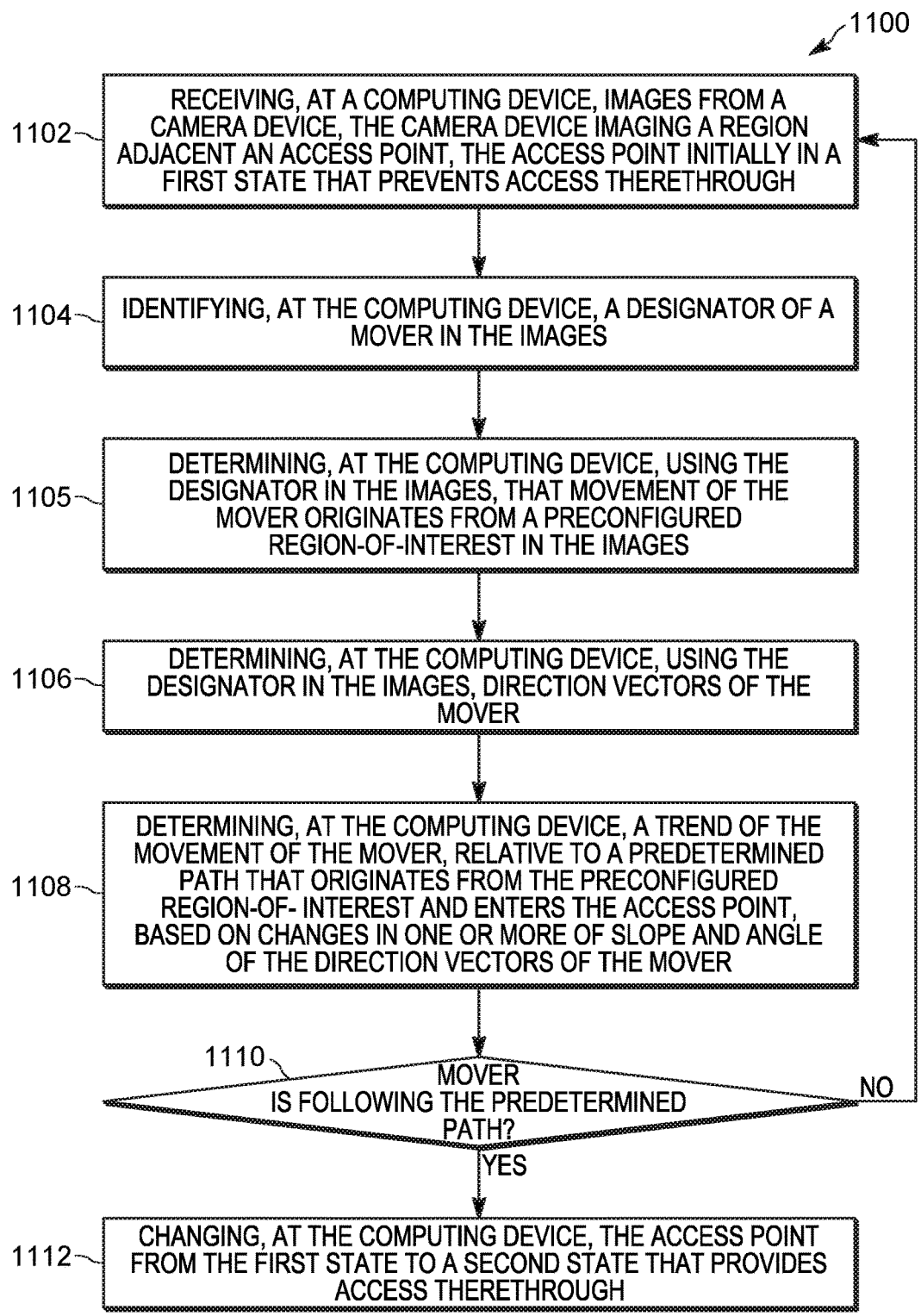
FIG. 11 is a flowchart of a method for controlling an access point based on movement trends of a mover relative to a predetermined path, in accordance with some examples.

In particular, attention is next directed to FIG. 11 which depicts a flowchart representative of a method 1100 for controlling an access point based on movement trends of a mover relative to preconfigured paths. The operations of the method 1100 of FIG. 11 correspond to machine readable instructions that are executed by the device 101, and specifically the controller 220 of the device 101. In the illustrated example, the instructions represented by the blocks of FIG. 11 are stored at the memory 222 for example, as a module of the application 223 and/or another application. The method 1100 of FIG. 11 is one way in which the controller 220 and/or the computing device 101 may be configured.

The method 1100 of FIG. 11 need not be performed in the exact sequence as shown and likewise various blocks may be performed in parallel rather than in sequence. Accordingly, the elements of method 1100 are referred to herein as "blocks" rather than "steps".

While the method 1100 is described hereafter with reference to FIG. 10, the method 1100 of FIG. 11 may be implemented on the system 100 of FIG. 1, and/or variations of the system of FIG. 1 as well. Hence, the following discussion of the method 1100 of FIG. 11 will lead to a further understanding of the system 100, and its various components, and variations thereof.

Furthermore, blocks of the method 1100 are generally similar and/or the same as respective blocks of the method 300, with like blocks having like numbers, but in an "1100" series rather than a "300" series, unless where indicated. For example, the block 1102 is generally similar to the block 302.

At a block 1102 (similar to the block 302 of the method 300), the controller 220 and/or the device 101 receives images from the camera device 103.

At a block 1104 (similar to the block 304 of the method 300), the controller 220 and/or the device 101 identifies a designator of a mover in the images.

At a block 1105, the controller 220 and/or the device 101 determines, using the designator in the images, that movement of the mover originates from a preconfigured region-of-interest 1011, 1012, 1013 in the images. For example, the controller 220 and/or the device 101 may compare a location (and/or a first location, and the like) of the mover, as determined from the designator (e.g. a first instance, and the like, of the designator in the images), to respective locations of the ROIs 1011, 1012, 1013 and determine that a location of the mover, for example, as the mover enters the region 110, is located at a location of one of the ROIs 1011, 1012, 1013 and/or within one of ROIs 1011, 1012, 1013 and/or is proximal one of the ROIs 1011, 1012, 1013. At the block 1105, the controller 220 and/or the device 101 further selects predetermined paths 1021, 1022, 1023, 1031, 1032, 1041, 1042 associated with the preconfigured region-of-interest 1011, 1012, 1013 from which movement of the mover originates. In a particular example, when movement of the mover originates from the ROI 1011, the controller 220 and/or the device 101 may select the predetermined path 1021 (and optionally the predetermined paths 1022, 1023) which, as described above, may be stored as statistical models at the memory 222.

At a block 1106 (similar to the block 306 of the method 300), the controller 220 and/or the device 101 determines, using the designator in the images, direction vectors of the mover 107.

At a block 1108, the controller 220 and/or the device 101 determines a trend of movement of the mover 107, relative to a predetermined path 1021, 1031, 1041 that originates from the preconfigured region-of-interest 1011, 1012, 1013 (e.g. from which the movement of the mover originated) and enters the access point 1005, based on changes in one or more of slope and angle of the direction vectors of the mover. Continuing with the example of movement of the mover originating at the ROI 1011, at the block 1108, the controller 220 and/or the device 101 may determine a trend of movement of the mover 107, relative to the predetermined path 1021 that originates from the preconfigured region-of-interest 1011 and enters the access point 1005, based on changes in one or more of slope and angle of the direction vectors of the mover.

Put another way, changes in one or more of slope and angle of the direction vectors of the mover may be used to determine a trend of movement of the mover, as described above, and/or a path of movement of the mover, which is compared to a predetermined path 1021, 1031, 1041 that originates from the preconfigured region-of-interest 1011, 1012, 1013 from which the movement of the mover originated.

Hence, at the block 1108, a trend and/or path of movement of the mover may be used to determine whether the mover is following a predetermined path 1021, 1031, 1041 that originates from the preconfigured region-of-interest 1011, 1012, 1013 from which the movement of the mover originated, and enters the access point 1005. For example, a regression analysis, and the like, may be used to determine whether locations and/or direction vectors of the mover (e.g. similar to the locations 601 and direction vectors 602) are following a predetermined path 1021, 1031, 1041, for example by comparing the locations and/or direction vectors of the mover are with a predetermined path 1021, 1031, 1041.

At a block 1110, the controller 220 and/or the device 101 determines whether, or not, the mover is following a predetermined path 1021, 1031, 1041.

In response to determining that the mover 107 is following a predetermined path 1021, 1031, 1041 (e.g. a "YES" decision at the block 1110), at a block 1112 (similar to the block 312 of the method 300), the controller 220 and/or the device 101 changes, at the computing device, the access point 105 from the first state to a second state that provides access therethrough. Furthermore, the controller 220 and/or the device 101 may implement the block 1112 in conjunction with an authorization process as also described above.

Returning briefly to the block 1110, in response to determining that the mover 107 is not following a predetermined path 1021, 1031, 1041 (e.g. a "NO" decision at the block 1110), the controller 220 and/or the device 101 may (as depicted) repeat the method 1100 from the block 1102 and/or any other suitable block of the method 1100. However, in general, in response to determining that the mover is not following a predetermined path 1021, 1031, 1041 the controller 220 and/or the device 101 maintains the access point in the first state.

Determining that the mover 107 is not trending towards the access point 105 may include, but is not limited to, determining, at the controller 220 and/or the device 101, the trend of movement of the mover, relative to a second predetermined path 1022, 1023, 1032, 1042 that originates from the preconfigured region-of-interest (e.g. from which the movement of the mover originated) and passes the access point 1005, based on the changes in one or more of the slope and the angle of the direction vectors of the mover. Hence, in in response to determining that the mover is following a second predetermined path 1022, 1023, 1032, 1042, the controller 220 and/or the device 101 may maintain, the access point 1005 in the first state. Continuing with the example of movement of the mover originating at the ROI 1011, at the block 1108, the controller 220 and/or the device 101 may determine a trend of movement of the mover 107, relative to a predetermined path 1022, 1023 that originates from the preconfigured region-of-interest 1011 and passes the access point 1005, based on changes in one or more of slope and angle of the direction vectors of the mover.

However, determining that the mover 107 is not trending towards the access point 105 may include, but is not limited to, determining, at the controller 220 and/or the device 101, that the trend of movement of the mover is not following any of the paths 1021, 1022, 1023, 1031, 1032, 1041, 1042 associated with an ROI 1011, 1012, 1013 from which the movement of the mover originates. For example, the trend of movement of the mover may be erratic and if the mover wishes to enter the access point 1005, the mover may need to use an access card and/or other credentials and/or biometric credentials, as described above, to enter the access point 1005.

It is understood that the method 1100 may further comprise the controller 220 and/or the device 101: maintaining, at the memory 222, for a plurality of preconfigured regions-of-interest 1011, 1012, 1013, respective statistical models of paths 1021, 1022, 1023, 1031, 1032, 1041, 1042 that respectively enter the access point 1005 and pass the access point 1005; determining, from a designator, prior to determining that the movement of the mover originates from a preconfigured region-of-interest 1011, 1012, 1013, a location of the mover relative to the plurality of preconfigured regions-of-interest 1011, 1012, 1013; and selecting a statistical model of a predetermined path 1021, 1031, 1041 that enters the access point 1005, from the respective statistical models, based on the location of the mover being at the region-of-interest 1011, 1012, 1013. In other words, at the block 1105, the location of the mover may be determined to be at one of the ROIs 1011, 1012, 1013, such as the ROI 1011, and an associated statistical model associated with path 1021 from the ROI 1011 to the access point 1005 is selected. In these examples, at the block 1110, the determining that the mover is following the predetermined path 1021 (for example) that originates from a preconfigured region-of-interest 1011 and enters the access point 1005 may comprise: comparing the trend of the movement of the mover with the statistical model for the predetermined path 1021.

It is understood that the method 1100 may further comprise the controller 220 and/or the device 101: prior to determining (e.g. at the block 1105) that the movement of the mover originates from a preconfigured region-of-interest 1011, 1012, 1013: monitoring respective movement of movers originating from a preconfigured region-of-interest 1011, 1012, 1013; determining, from the respective movement of the movers, respective statistical models of paths 1021, 1022, 1023, 1031, 1032, 1041, 1042 of the movers, as described above; and storing, at the memory 222, the respective statistical models of the paths 1021, 1022, 1023, 1031, 1032, 1041, 1042 that respectively enter the access point 1005 and pass the access point 1005. Indeed, in these examples, determining (e.g. at the block 1110) that the mover is following a predetermined path 1021, 1031, 1041 that originates from a preconfigured region-of-interest 1011, 1012, 1013 and enters the access point 1005 comprises: comparing the trend of the movement of the mover with a statistical model for the predetermined path 1021, 1031, 1041. In these examples, at the block 1110, the determining that the mover is following the predetermined path 1021 (for example) that originates from a preconfigured region-of-interest 1011 and enters the access point 1005 may comprise: comparing the trend of the movement of the mover with the statistical model for the predetermined path 1021.

Indeed, it is understood that once an ROI 1011, 1012, 1013 is selected, at the block 1105, determining the trend of the movement of the mover at the block 1108, relative to a predetermined path that originates from an ROI 1011, 1012, 1013 may occur only for a predetermined path associated with the ROI selected at the block 1105. Hence, for example, continuing with the example of the ROI 1011 being selected at the block 1105, at the block 1108, the trend of the movement of the mover may be compared to the predetermined path 1021 (and optionally the predetermined path 1022, 1023) associated with the ROI 10111, but not the predetermined paths 1031, 1032, 1041, 1042 associated with the ROIs 1012, 1013.

While the method 1100 is described with respect to three ROIs 1011, 1012, 1013 are depicted, any suitable number of ROIs may be used including fewer than three ROIs and more than three ROIs. Furthermore, use of ROIs may be optional and the device 101 may rely on the aforementioned regions 111,112 and/or the device 101 may rely on both the aforementioned regions 111, 112 and the ROIs 1011, 1012, 1013 and/or neither of the regions 111, 112 and the ROIs 1011, 1012, 1013 to determine whether or not to open an access point, and the like.

When the device 101 relies on both the aforementioned regions 111, 112 and the ROIs 1011, 1012, 1013, the device 101 may begin determining (e.g. at the block 1108) a trend of the movement of the mover, relative to a predetermined path that originates from a preconfigured region-of-interest and enters an access point (e.g. based on changes in one or more of slope and angle of the direction vectors of the mover) when the device 101 determines that the mover is located in a first sub-region (e.g. the sub-region 111, and the like); furthermore, the device 101 may, in response to determining that the mover is following the predetermined path, change an access point from a first state, that prevents access therethrough, to a second state that provides access therethrough when the mover is located in a second-sub-region (e.g. the sub-region 112, and the like) smaller than the first sub-region. Indeed, aspects of the methods 300, 1100, as described herein, may be combined in any suitable manner; such combinations are described in more detail below with respect to first and second further aspects of the present specification.

Figure 12:
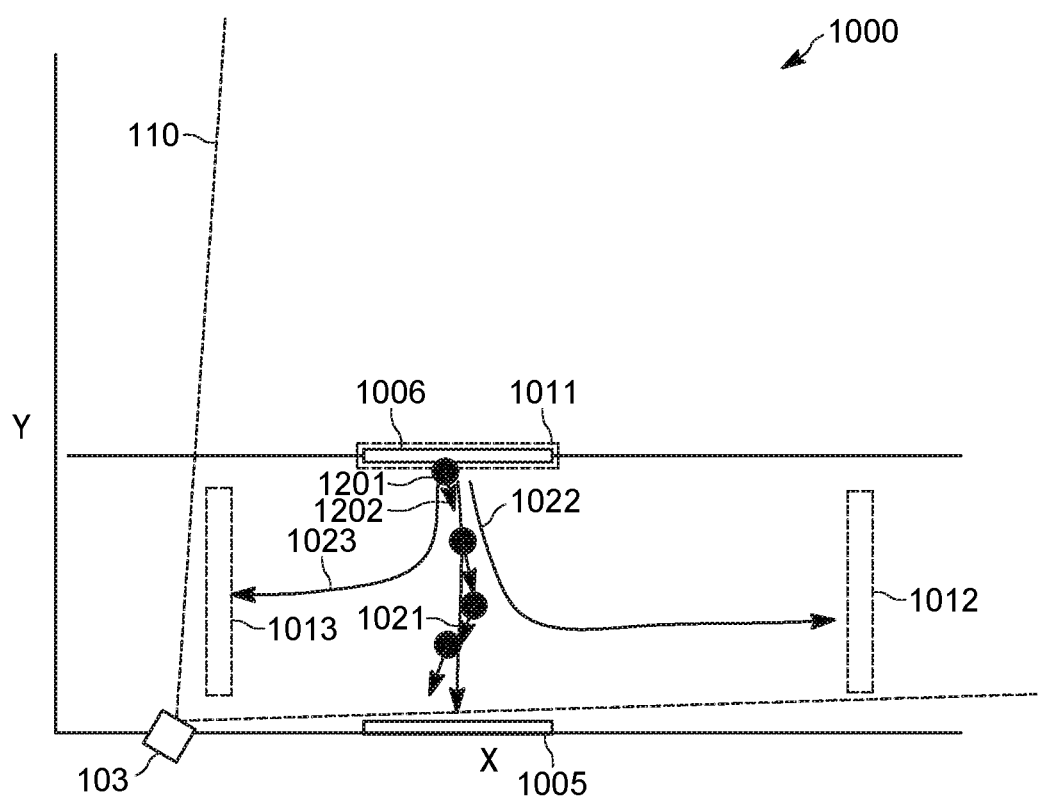
FIG. 12 depicts the graphical view of FIG. 10 showing positions of a mover, and respective direction vectors between time-adjacent positions, used to determine a trend of movement of the mover relative to a predetermined path that enters the access point, in accordance with some examples.
Figure 13:
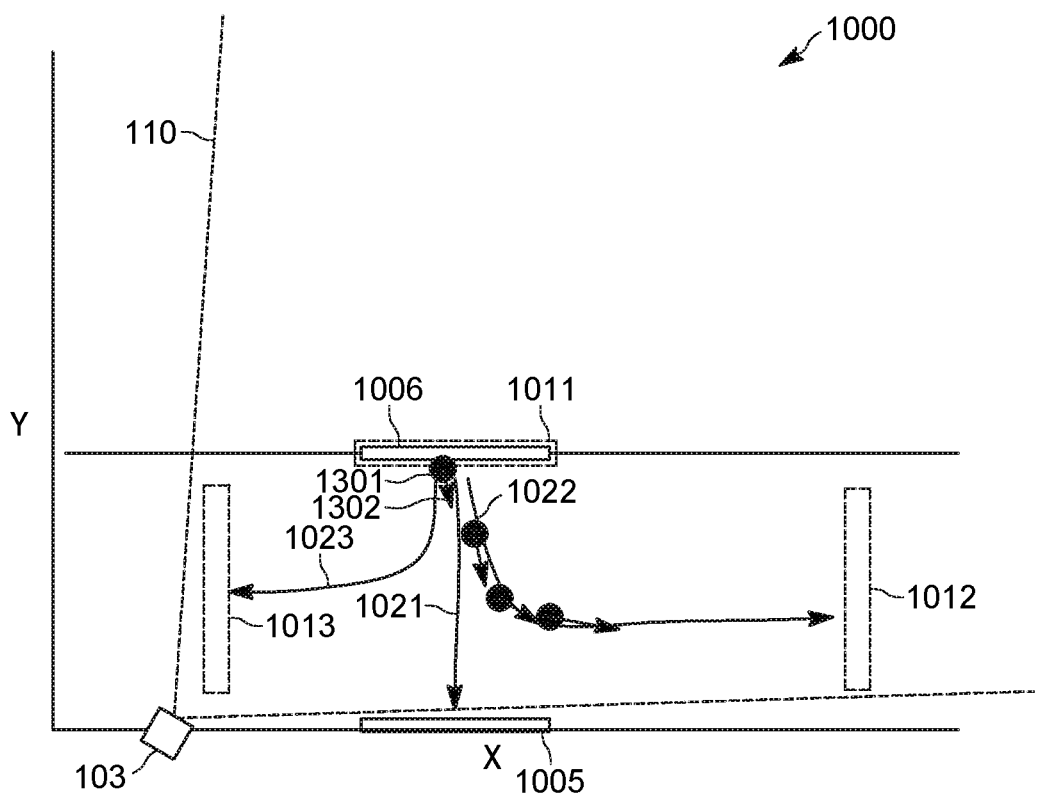
FIG. 13 depicts the graphical view of FIG. 10 showing positions of a mover, and respective direction vectors between time-adjacent positions, used to determine a trend of movement of the mover relative to a predetermined path that passes, and/or does not enter, the access point, in accordance with some examples.

Attention is next directed to FIG. 12 and FIG. 13 which depict an example of the method 1100, and are substantially similar to FIG. 10, with like components having like numbers.

In FIG. 12, the device 101 has determined locations 1201 and direction vectors 1202 of a mover. While for simplicity only one location 1201 and one direction vector 1202 is indicated/labelled in FIG. 12, it is understood that each circle in FIG. 12 corresponds to a respective location 1201, and each arrow extending from a circle corresponds to a respective direction vector 1202.

It is further understood that the locations 1201 are determined using images from the camera device 103 (e.g. as received at the block 1102 of the method 1100), and that a designator of a mover has been identified in the images (e.g. at the block 1104 of the method 1100).

Furthermore, adjacent locations 1201 are understood to be time-adjacent locations, and that a first location 1201 is at the ROI 1011. Hence, as depicted, the device 101 may determine (e.g. at the block 1105 of the method 1100) that movement of the mover originates from the ROI 1011. As such, the predetermined path 1021 is selected (and optionally, as depicted, the predetermined paths 1022, 1023) may be selected, while the other predetermined paths 1031, 1032, 1041, 1042 associated with the other ROIs 1012, 1013 are ignored.

As depicted, the direction vectors 1202 have been determined (e.g. at the block 1106 of the method 1100) and the trend of movement of the mover, as represented by changes in one or more of slope and angle of the direction vectors 1202, may be compared (e.g. at the block 1108 of the method 1100) to the path 1021, for example on an on-going basis as the locations 1201 and direction vectors 1202 are determined. The device 101 may determine (e.g. at the block 1110 of the method 1100) that the mover is following the predetermined path 1021 when at least given changes in one or more of slope and angle of at least a given number of the direction vectors 1202 align with the predetermined path 1021. Indeed, such a determination may also include comparing the locations 1201 (e.g. starting locations of the direction vectors 1202) with the predetermined path 1021 such that, at the block 1110 of the method 1100, the locations 1201 are compared with the predetermined path 1021, as well as directions of movement of the mover, as represented by the changes in one or more of slope and angle of the direction vectors 1202, which may be represented by a running average of the direction vectors 1202. Indeed, as depicted, the locations 1201 are all located near to the predetermined path 1021 and the direction vectors 1202 (and/or an average and/or running average of the direction vectors 1202) are generally following the direction(s) of the predetermined path 1021. Hence, at the block 1112, the device 101 may open the access point 1005, and the like.

Attention is next directed to FIG. 13 which depicts that device 101 has determined locations 1301 and direction vectors 1302 of another mover whose movement originates at the ROI 1011. While for simplicity only one location 1301 one direction vector 1302 is indicated/labelled in FIG. 13, it is understood that each circle in FIG. 13 corresponds to a respective location 1301, and each arrow extending from a circle corresponds to a respective direction vector 1302.

However, in contrast to FIG. 12, in FIG. 13, movement of the mover is not trending along the path 1021; rather movement of the mover is trending along the path 1022 which passes the access point 1005. Hence, at the block 1112, the device 101 does not open the access point 1005.

Hence, a first further aspect of the present specification provides a method comprising: receiving, at a computing device, images from a camera device, the camera device configured to image a region adjacent an access point, the access point initially in a first state that prevents access therethrough; identifying, at the computing device, a designator of a mover in the images; determining, at the computing device, using the designator in the images, that movement of the mover originates from a preconfigured region-of-interest in the images; determining, at the computing device, using the designator in the images, direction vectors of the mover; determining, at the computing device, a trend of the movement of the mover, relative to a predetermined path that originates from the preconfigured region-of-interest and enters the access point, based on changes in one or more of slope and angle of the direction vectors of the mover; and in response to determining that the mover is following the predetermined path, changing, at the computing device, the access point from the first state to a second state that provides access therethrough.

In some examples, the method of the first further aspect further comprises: in response to determining that the mover is not following the predetermined path, maintaining the access point in the first state.

In some examples, the method of the first further aspect further comprises: determining, at the computing device, the trend of movement of the mover, relative to a second predetermined path that originates from the preconfigured region-of-interest and passes the access point, based on the changes in one or more of the slope and the angle of the direction vectors of the mover; and in response to determining that the mover is following the second predetermined path maintaining, the access point in the first state.

In some examples, the method of the first further aspect further comprises: prior to determining that the movement of the mover originates from the preconfigured region-of-interest: monitoring respective movement of movers originating from the preconfigured region-of-interest; determining, from the respective movement of the movers, respective statistical models of paths of the movers; and storing, at a memory, the respective statistical models of the paths that respectively enter the access point and pass the access point, wherein the determining that the mover is following the predetermined path that originates from the preconfigured region-of-interest and enters the access point comprises: comparing the trend of the movement of the mover with a statistical model for the predetermined path.

In some examples, the method of the first further aspect further comprises: maintaining, at a memory, for a plurality of preconfigured regions-of-interest, respective statistical models of paths that respectively enter the access point and pass the access point; determining, from the designator, prior to determining that the movement of the mover originates from the preconfigured region-of-interest, a location of the mover relative to the plurality of preconfigured regions-of-interest; and selecting a statistical model of the predetermined path, from the respective statistical models, based on the location of the mover being at the region-of-interest, wherein the determining that the mover is following the predetermined path that originates from the preconfigured region-of-interest and enters the access point comprises: comparing the trend of the movement of the mover with the statistical model for the predetermined path.

In some examples, the method of the first further aspect further comprises: ignoring, at the computing device, predetermined paths not associated with the preconfigured region-of-interest from which the movement of the mover originates.

In some examples, the method of the first further aspect further comprises: beginning the determining of the trend of the movement of the mover, relative to the predetermined path that originates from the preconfigured region-of-interest and enters the access point, when the mover is located within a sub-region of the region adjacent the access point, as determined using the designator in the images.

In some examples, in the method of the first further aspect, changing the access point from the first state to the second state occurs in response to: determining that the mover is following the predetermined path within a first sub-region of the region adjacent the access point; and determining that the mover is located in a second sub-region of the region adjacent the access point, the second sub-region being one or more of: smaller than the first sub-region and within the first sub-region.

In some examples, in the method of the first further aspect, determining the trend of movement of the mover, relative to the predetermined path that originates from the preconfigured region-of-interest and enters the access point, based on changes in one or more of the slope and angle of the direction vectors comprises: determining that an average and/or a running average of the slope of the direction vectors, indicates that the mover is following the predetermined path; and/or determining that an average and/or a running average of the slope of the direction vectors, in combination with locations of the mover, indicates that the mover is following the predetermined path.

In some examples, in the method of the first further aspect, determining the trend of movement of the mover, relative to the predetermined path that originates from the preconfigured region-of-interest and enters the access point, based on changes in one or more of the slope and angle of the direction vectors comprises: determining that one or more of a differential and a direction field differential of the direction vectors indicates that the mover is following the predetermined path.

In some examples, in the method of the first further aspect, the first state comprises one or more of a locked state and a closed state of the access point; and the second state comprises one or more of an unlocked state and an open state of the access point.

In some examples, in the method of the first further aspect, changing the access point from the first state to the second state occurs in response to: determining that the mover is following the predetermined path; and one or more of: determining that a body part identified in the designator comprises an authorized body part; and exchanging an authorized token with a mobile device.

In some examples, the method of the first further aspect further comprises: determining, by the computing device, using the designator of the images, that the mover is located in the region adjacent the access point, but has stopped moving, based on the designator of the images being about stationary in the images; and in response to determining that the mover is located in the region adjacent the access point, but has stopped moving, maintaining the access point in the first state.

Hence, a second further aspect of the present specification provides a device comprising: controller in communication with a camera device and an access point, the camera device configured to image a region adjacent the access point, the access point initially in a first state that prevents access therethrough, the controller configured to: receive images from the camera device; identify a designator of a mover in the images; determine, using the designator in the images, that movement of the mover originates from a preconfigured region-of-interest in the images; determine, using the designator in the images, direction vectors of the mover; determine a trend of the movement of the mover, relative to a predetermined path that originates from the preconfigured region-of-interest and enters the access point, based on changes in one or more of slope and angle of the direction vectors of the mover; and in response to determining that the mover is following the predetermined path, change the access point from the first state to a second state that provides access therethrough.

In some examples, at the device of the second further aspect, the controller is further configured to: in response to determining that the mover is not following the predetermined path, maintain the access point in the first state.

In some examples, at the device of the second further aspect, the controller is further configured to: determine the trend of movement of the mover, relative to a second predetermined path that originates from the preconfigured region-of-interest and passes the access point, based on the changes in one or more of the slope and the angle of the direction vectors of the mover; and in response to determining that the mover is following the second predetermined path maintain, the access point in the first state.

In some examples, at the device of the second further aspect, the controller is further configured to: prior to determining that the movement of the mover originates from the preconfigured region-of-interest: monitor respective movement of movers originating from the preconfigured region-of-interest; determine, from the respective movement of the movers, respective statistical models of paths of the movers; and store, at a memory, the respective statistical models of the paths that respectively enter the access point and pass the access point, wherein the controller is yet further configured to determine that the mover is following the predetermined path that originates from the preconfigured region-of-interest and enters the access point by: comparing the trend of the movement of the mover with a statistical model for the predetermined path.

In some examples, at the device of the second further aspect, the controller is further configured to: maintain, at a memory, for a plurality of preconfigured regions-of-interest, respective statistical models of paths that respectively enter the access point and pass the access point; determine, from the designator, prior to determining that the movement of the mover originates from the preconfigured region-of-interest, a location of the mover relative to the plurality of preconfigured regions-of-interest; and select a statistical model of the predetermined path, from the respective statistical models, based on the location of the mover being at the region-of-interest, wherein the controller is yet further configured to determine that the mover is following the predetermined path that originates from the preconfigured region-of-interest and enters the access point by: comparing the trend of the movement of the mover with the statistical model for the predetermined path.

In some examples, at the device of the second further aspect, the controller is further configured to: ignore predetermined paths not associated with the preconfigured region-of-interest from which the movement of the mover originates.

In some examples, at the device of the second further aspect, the controller is further configured to: begin the determining of the trend of the movement of the mover, relative to the predetermined path that originates from the preconfigured region-of-interest and enters the access point, when the mover is located within a sub-region of the region adjacent the access point, as determined using the designator in the images.

In some examples, at the device of the second further aspect, the controller is further configured to change the access point from the first state to the second state in response to: determining that the mover is following the predetermined path within a first sub-region of the region adjacent the access point; and determining that the mover is located in a second sub-region of the region adjacent the access point, the second sub-region being one or more of: smaller than the first sub-region and within the first sub-region.

In some examples, at the device of the second further aspect, the controller is further configured to determine the trend of movement of the mover, relative to the predetermined path that originates from the preconfigured region-of-interest and enters the access point, based on changes in one or more of the slope and angle of the direction vectors by: determining that an average and/or a running average of the slope of the direction vectors, indicates that the mover is following the predetermined path; and/or determining that an average and/or a running average of the slope of the direction vectors, in combination with locations of the mover, indicates that the mover is following the predetermined path.

In some examples, at the device of the second further aspect, the controller is further configured to determine the trend of movement of the mover, relative to the predetermined path that originates from the preconfigured region-of-interest and enters the access point, based on changes in one or more of the slope and angle of the direction vectors by: determining that one or more of a differential and a direction field differential of the direction vectors indicates that the mover is following the predetermined path.

In some examples, at the device of the second further aspect, the first state comprises one or more of a locked state and a closed state of the access point; and the second state comprises one or more of an unlocked state and an open state of the access point.

In some examples, at the device of the second further aspect the controller is further configured to change the access point from the first state to the second state occurs in response to: determining that the mover is following the predetermined path; and one or more of: determining that a body part identified in the designator comprises an authorized body part; and exchanging an authorized token with a mobile device.

In some examples, at the device of the second further aspect, the controller is further configured to: determine, using the designator of the images, that the mover is located in the region adjacent the access point, but has stopped moving, based on the designator of the images being about stationary in the images; and in response to determining that the mover is located in the region adjacent the access point, but has stopped moving, maintain the access point in the first state.

As should be apparent from this detailed description above, the operations and functions of the computing device are sufficiently complex as to require their implementation on a computer system, and cannot be performed, as a practical matter, in the human mind. Computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any component(s) that may cause any benefit, advantage, or solution to occur or become more pronounced are not to be construed as a critical, required, or essential features or components of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of components does not include only those components but may include other components not expressly listed or inherent to such process, method, article, or apparatus. A component proceeded by "comprises . . . a", "has . . . a", "includes . . . a", "contains . . . a" does not, without more constraints, preclude the existence of additional identical components in the process, method, article, or apparatus that comprises, has, includes, contains the component. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
receiving, at a computing device, images from a camera device, the camera device configured to image a region adjacent an access point, the access point initially in a first state that prevents access therethrough;
identifying, at the computing device, a designator of a mover in the images;
determining, at the computing device, using the designator in the images, direction vectors of the mover;
determining, at the computing device, a trend of movement of the mover, relative to the access point, based on changes in one or more of slope and angle of the direction vectors of the mover;
in response to determining that the mover is trending towards the access point, changing, at the computing device, the access point from the first state to a second state that provides access therethrough;
determining, by the computing device, using the designator of the images, that the mover is located in the region adjacent the access point, but has stopped moving, based on the designator of the images being about stationary in the images; and
in response to determining that the mover is located in the region adjacent the access point, but has stopped moving, maintaining the access point in the first state.

2. The method of claim 1, further comprising:
beginning the determining of the trend of the movement of the mover when the mover is located within a sub-region of the region adjacent the access point, as determined using the designator in the images.

3. The method of claim 1, wherein the changing the access point from the first state to the second state occurs in response to:
determining that the mover is trending towards the access point within a first sub-region of the region adjacent the access point; and
determining that the mover is located in a second sub-region of the region adjacent the access point, the second sub-region being one or more of: smaller than the first sub-region and within the first sub-region.

4. The method of claim 1, wherein the determining that the mover is trending towards the access point comprises one or more of:
determining that the mover is trending towards a first zone that includes the access point; and
determining that the mover is trending towards a second zone that includes the access point and given regions extending from one or more ends of the access point.

5. The method of claim 1, wherein the determining the trend of movement of the mover, relative to the access point, based on changes in one or more of the slope and angle of the direction vectors comprises:
determining that an average of the slope of the direction vectors indicates that the mover is trending towards the access point.

6. The method of claim 1, wherein the determining the trend of movement of the mover, relative to the access point, based on changes in one or more of the slope and angle of the direction vectors comprises:
determining that one or more of a differential and a direction field differential of the direction vectors indicates that the mover is trending towards the access point.

7. The method of claim 1, wherein the determining that the mover is trending towards the access point comprises:
determining that the changes in one or more of the slope and the angle of the direction vectors of the mover indicates that the trend of the movement of the mover intersects with one or more of the access point and given regions extending from one or more ends of the access point.

8. The method of claim 1, wherein: the first state comprises one or more of a locked state and a closed state of the access point; and the second state comprises one or more of an unlocked state and an open state of the access point.

9. The method of claim 1, wherein the changing the access point from the first state to the second state occurs in response to:
determining that the mover is trending towards the access point; and
one or more of: determining that a body part identified in the designator comprises an authorized body part; and exchanging an authorized token with a mobile device.

10. A device comprising:
a controller in communication with a camera device and an access point, the camera device configured to image a region adjacent the access point, the access point initially in a first state that prevents access therethrough,
the controller configured to:
receive images from the camera device;
identify a designator of a mover in the images;
determine, using the designator in the images, direction vectors of the mover;

determine a trend of movement of the mover, relative to the access point, based on changes in one or more of slope and angle of the direction vectors of the mover;

in response to determining that the mover is trending towards the access point, change the access point from the first state to a second state that provides access therethrough;

determine, using the designator of the images, that the mover is located in the region adjacent the access point, but has stopped moving, based on the designator of the images being about stationary in the images; and in response to determining that the mover is located in the region adjacent the access point, but has stopped moving, maintain the access point in the first state.

11. The device of claim 10, wherein the controller is further configured to:

begin the determining of the trend of the movement of the mover when the mover is located within a sub-region of the region adjacent the access point, as determined using the designator in the images.

12. The device of claim 10, wherein the controller is further configured to change the access point from the first state to the second state in response to:

determining that the mover is trending towards the access point within a first sub-region of the region adjacent the access point; and determining that the mover is located in a second sub-region of the region adjacent the access point, the second sub-region being one or more of: smaller than the first sub-region and within the first sub-region.

13. The device of claim 10, wherein the controller is further configured to determine that the mover is trending towards the access point by one or more of:

determining that the mover is trending towards a first zone that includes the access point; and determining that the mover is trending towards a second zone that includes the access point and given regions extending from one or more ends of the access point.

14. The device of claim 10, wherein the controller is further configured to determine the trend of movement of the mover, relative to the access point, based on changes in one or more of the slope and angle of the direction vectors by:

determining that an average of the slope of the direction vectors indicates that the mover is trending towards the access point.

15. The device of claim 10, wherein the controller is further configured to determine the trend of movement of the mover, relative to the access point, based on changes in one or more of the slope and angle of the direction vectors by:

determining that one or more of a differential and a direction field differential of the direction vectors indicates that the mover is trending towards the access point.

16. The device of claim 10, wherein the controller is further configured to determine that the mover is trending towards the access point by:

determining that the changes in one or more of the slope and the angle of the direction vectors of the mover indicates that the trend of the movement of the mover intersects with one or more of the access point and given regions extending from one or more ends of the access point.

17. The device of claim 10, wherein: the first state comprises one or more of a locked state and a closed state of the access point; and the second state comprises one or more of an unlocked state and an open state of the access point.

18. The device of claim 10, wherein the controller is further configured to change the access point from the first state to the second state in response to:

determining that the mover is trending towards the access point; and one or more of: determining that a body part identified in the designator comprises an authorized body part; and exchanging an authorized token with a mobile device.

19. A method comprising:

receiving, at a computing device, images from a camera device, the camera device configured to image a region adjacent an access point, the access point initially in a first state that prevents access therethrough;

identifying, at the computing device, a designator of a mover in the images;

determining, at the computing device, using the designator in the images, that movement of the mover originates from a preconfigured region-of-interest in the images;

determining, at the computing device, using the designator in the images, direction vectors of the mover;

determining, at the computing device, a trend of the movement of the mover, relative to a predetermined path that originates from the preconfigured region-of-interest and enters the access point, based on changes in one or more of slope and angle of the direction vectors of the mover;

in response to determining that the mover is following the predetermined path, changing, at the computing device, the access point from the first state to a second state that provides access therethrough;

determining, by the computing device, using the designator of the images, that the mover is located in the region adjacent the access point, but has stopped moving, based on the designator of the images being about stationary in the images; and in response to determining that the mover is located in the region adjacent the access point, but has stopped moving, maintaining the access point in the first state.

* * * * *